United States Patent
Ghosh et al.

(10) Patent No.: US 12,454,537 B2
(45) Date of Patent: Oct. 28, 2025

(54) HIV-1 PROTEASE INHIBITORS AND USES THEREOF

(71) Applicant: Purdue Research Foundation, West Lafayette, IN (US)

(72) Inventors: Arun K. Ghosh, West Lafayette, IN (US); Satish Kovela, West Lafayette, IN (US); Hiroaki Mitsuya, Kumamoto (JP)

(73) Assignee: Purdue Research Foundation, West Lafayette, IN (US)

( * ) Notice: Subject to any disclaimer, the term of this patent is extended or adjusted under 35 U.S.C. 154(b) by 1069 days.

(21) Appl. No.: 17/423,245

(22) PCT Filed: Jan. 15, 2020

(86) PCT No.: PCT/US2020/013707
§ 371 (c)(1),
(2) Date: Jul. 15, 2021

(87) PCT Pub. No.: WO2020/150369
PCT Pub. Date: Jul. 23, 2020

(65) Prior Publication Data
US 2022/0363688 A1 Nov. 17, 2022

Related U.S. Application Data

(60) Provisional application No. 62/792,668, filed on Jan. 15, 2019.

(51) Int. Cl.
*C07D 493/08* (2006.01)
*A61P 31/18* (2006.01)
*C07F 9/6561* (2006.01)

(52) U.S. Cl.
CPC ............ *C07D 493/08* (2013.01); *A61P 31/18* (2018.01); *C07F 9/6561* (2013.01)

(58) Field of Classification Search
CPC ................................ C07D 493/08; A61P 31/18
See application file for complete search history.

(56) References Cited

U.S. PATENT DOCUMENTS

| 8,501,961 B2 | 8/2013 | Ghosh |
| 9,670,225 B2 * | 6/2017 | Ghosh ..................... A61P 31/18 |
| 2017/0088555 A1 | 3/2017 | Ghosh et al. |

FOREIGN PATENT DOCUMENTS

| WO | 2008118849 | 10/2008 |
| WO | 2012092188 | 7/2012 |
| WO | WO-2015175994 A1 | 11/2015 |
| WO | WO-2020150369 A1 | 7/2020 |

OTHER PUBLICATIONS

"International Application Serial No. PCT/US2020/013707, International Search Report mailed Apr. 6, 2020", 2 pgs.
"International Application Serial No. PCT/US2020/013707, Written Opinion mailed Apr. 6, 2020", 3 pgs.
"European Application Serial No. 20742121.5, Response to Communication pursuant to Rules 161(2) and 162 EPC filed Jun. 14, 2022", 22 pgs.
"European Application Serial No. 20742121.5, Extended European Search Report mailed Dec. 19, 2022", 7 pgs.
International Application Serial No. PCT US2020/013707, International Preliminary Report on Patentability mailed Jul. 29, 2021, 5 pgs.
Ghosh, Arun K., "Design and Development of Highly Potent HIV-1 Protease Inhibitors with a Crown-like Oxotricyclic Core as the P2-Ligand to Combat Multidrug-Resistant HIV Variants", HHS Public Access, published in final edited form as: J Med Chem, 60(10), 2017, 4267-4278, 30 pgs.
"European Application Serial No. 20742121.5, Response filed Jul. 20, 2023 to Extended European Search Report mailed Dec. 19, 2022", 19 pgs.
"European Application Serial No. 20742121.5, Communication Pursuant to Article 94(3) EPC mailed Oct. 30, 2024", 4 pgs.
"European Application Serial No. 20742121.5, Response filed Feb. 20, 2025 to Communication Pursuant to Article 94(3) EPC mailed Oct. 30, 2024", 70 pgs.

* cited by examiner

*Primary Examiner* — Kortney L. Klinkel
*Assistant Examiner* — Richard Grant Peckham
(74) *Attorney, Agent, or Firm* — Schwegman Lundberg & Woessner, P.A.

(57) ABSTRACT

Compounds of formula (I) and pharmaceutically acceptable salts and solvates thereof are disclosed. The compounds HIV-1 protease and, as a result, are useful in the treatment of HIV infection.

16 Claims, No Drawings

HIV-1 PROTEASE INHIBITORS AND USES THEREOF

CROSS-REFERENCE TO RELATED APPLICATIONS

This application is a U.S. national stage filing under 35 U.S.C. 371 from International Application No. PCT/US2020/013707, filed on 15 Jan. 2020, and published as WO 2020/150369 on 23 Jul. 2020, which claims the benefit of U.S. Provisional Appl. Ser. No. 62/792,668, filed Jan. 15, 2019, which applications are incorporated by reference as if fully set forth herein.

STATEMENT OF GOVERNMENT SUPPORT

This invention was made with government support under grant AI150466 awarded by the National Institutes of Health. The government has certain rights in the invention.

BACKGROUND OF THE INVENTION

The AIDS epidemic is one of the most challenging problems in medicine in the 21st century. Among many strategies to combat this disease, highly active antiretroviral therapy (HAART) with HIV protease inhibitors (PIs) in combination with reverse transcriptase inhibitors (RTIs) continues to be the first line treatment for control of HIV infection. Although such combination therapy has improved quality of life, enhanced HIV management, and halted the progression of the disease, there remain many challenges to treating this devastating disease, including decreasing both the toxicity and complexity of these treatment regimens. In addition, there is a growing population of patients that is developing multi-drug resistant strains of HIV. And there is ample evidence that these strains can be further transmitted.

Even though HAART has had a major impact on the AIDS epidemic in industrially advanced nations, it has not achieved the eradication of human immunodeficiency virus type 1 (HIV 1), in part due to the viral reservoirs remaining in blood and infected tissues. The limitation of antiviral therapy of AIDS is also exacerbated by complicated regimens, the development of drug-resistant HIV-1 variants, and a number of inherent adverse effects. Further, efforts to bring about the optimal benefits of HAART have met with a number of challenges, including (i) drug-related toxicities; (ii) partial restoration of immunologic functions once individuals developed AIDS; (iii) development of various cancers as a consequence of survival prolongation; (iv) flame-up of inflammation in individuals receiving HAART or immune re-construction syndrome (IRS); and (v) increased cost of antiviral therapy. Such limitations of HAART are exacerbated by the development of drug-resistant HIV-1 variants.

There is presently a paucity of antiretroviral drugs or agents that are not only substantially specific for HIV-1, but also specific for HIV-1 variants and devoid of toxicity or side effects in the therapy of AIDS.

SUMMARY OF THE INVENTION

The disclosure is directed to potent HIV-1 protease inhibitors or aspartyl protease inhibitors for the treatment of AIDS and HIV infections. HIV-1 protease inhibitors can be critical components of antiretroviral treatment of HIV/AIDS. HIV-1 protease inhibitors can also be components of antiretroviral treatment of HIV/AIDS in a monotherapy regimen, wherein the HIV-1 protease inhibitors or aspartyl protease inhibitors are administered alone; that is, in the absences of, e.g., RTIs.

The HIV-1 protease inhibitors or aspartyl protease inhibitors described herein represent a conceptually new class of HIV-1 protease inhibitors that are surprisingly and unexpectedly nearly 100-fold more potent than, e.g., darunavir in cell culture assay. In addition, the HIV-1 protease inhibitors or aspartyl protease inhibitors described herein can have significant antiviral activity against darunavir-resistant HIV-1 variants.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Various embodiments of the present invention are directed to a compound of the formula (I):

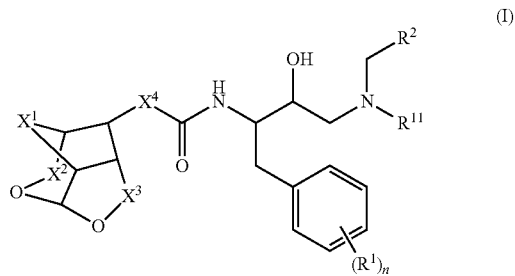

or a pharmaceutically acceptable salt, polymorph, prodrug, solvate or clathrate thereof, wherein:

$X^1$ is alkylene, —O—, —$CH_2NR^4$—, —$CH_2O$— or —$NR^4$—;

$X^2$ and $X^3$ are each, independently alkylene;

$X^4$ is alkylene, —$NR^4$—, —$CHR^4$— or —$CR^{4a}R^{4b}$—, wherein $R^4$ is alkyl, aryl, heteroaryl, $NHR^{4c}$ or $OR^{4c}$, wherein $R^{4c}$ is H, alkyl, alkyl, alkylaryl or heterocyclylalkyl, $R^{4a}$ is $NHR^{4d}$ or $OR^{4d}$ wherein $R^{4b}$ is alkyl and $R^{4c}$ is H, alkyl, cycloalkyl or heterocyclyl or $R^{4a}$ and $R^{4b}$, together with the nitrogen atom to which they are attached, form a cycloalkyl ring or a heterocyclyl ring;

n is an integer from 0 to 4;

$R^1$ is alkoxy, hydroxyalkyl, halo or heterocyclylalkyl;

$R^2$ is alkyl, haloalkyl, aryl, arylalkyl, cycloalkylalkyl, heterocyclylcarbonyl, heterocyclyl, heterocyclylalkyl or —$C(R^7R^8)$-alkylene-$R^9$, wherein $R^7$ and $R^8$ are each, independently hydrogen, alkyl, aryl, arylalkyl, heteroaryl, heteroarylalkyl, or, $R^7$ and $R^8$, together with the carbon atom to which they are attached, form a cycloalkyl or a heterocyclyl group, $R^9$ is hydrogen, $OR^{10}$, $OC(O)N(R^{10})_2$, CN, $NO_2$, $CF_3$, $OCF_3$, $N(R^{10})_2$, $SR^{10}$, $SOR^{10}$, $SO_2R^{10}$, $SO_2N(R^{10})_2$, $SO_3R$, $C(O)R^{10}$, $C(O)OR^{10}$, $OC(O)R^{10}$, $C(O)N(R^{10})_2$, $(CH_2)_{0-2}N(R^{10})C(O)R^{10}$ or $(CH_2)_{0-2}N(R^{10})C(O)OR^{10}$, and $R^{10}$ is hydrogen, alkyl, acyl, cycloalkyl, aryl, aralkyl, heterocyclyl, heteroaryl, or heteroarylalkyl;

$R^{11}$ is —SO$_2$R$^3$, —C(O)N(R$^{12}$)$_2$, —C(O)-alkylene-X$^5$-R$^{10}$, wherein X$^5$ is S, O or NR$^6$, R$^6$ is H, alkyl, cycloalkyl or alkylaryl or —C(O)R$^{10}$; and R$^3$ is aryl or heterocyclyl;

R$^{12}$ is hydrogen, alkyl, alkylaryl, heterocyclyl or the two R$^{12}$ groups on an N(R$^{12}$)$_2$, together with the nitrogen atom to which they are attached, form a heterocyclyl group; and R$^{13}$ is hydrogen, alkyl, —N(R$^{12}$)$_2$ or –OR$^{12}$.

In some embodiments, R$^2$ and R$^{11}$, together with the —CH$_2$N— that connects them, form a heterocyclyl or substituted heterocyclyl group.

All diastereomers of the compounds of the formula (I) are contemplated herein. In various other embodiments of the present invention are directed to a compound of the formula (Ia)-(Ih):

(Ia)
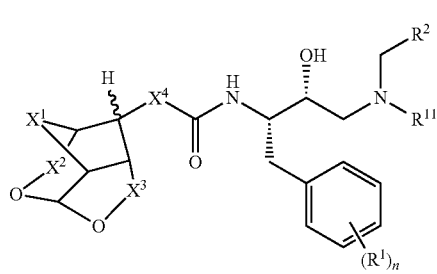

(Ib)
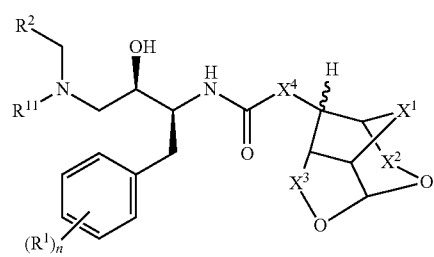

(Ic)
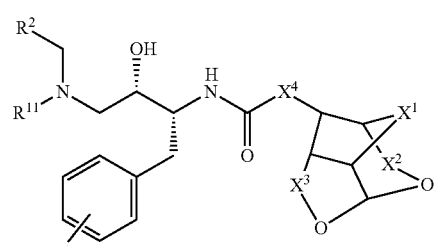

(Id)
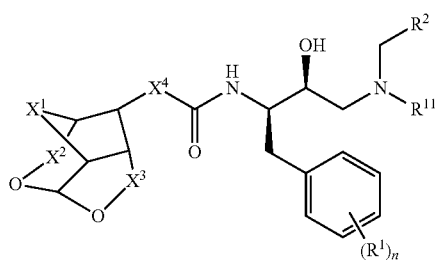

(Ie)
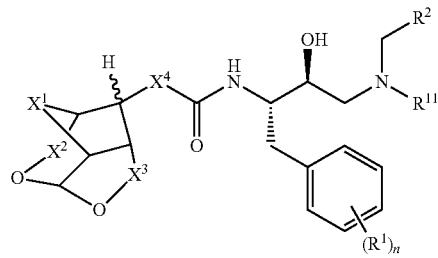

(If)
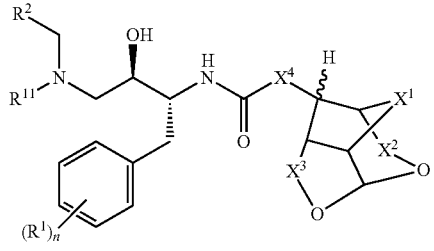

(Ig)
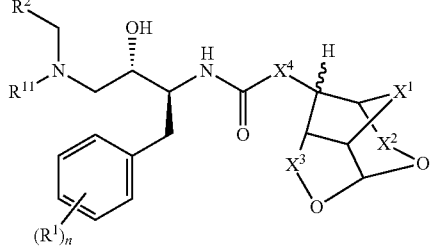

(Ih)
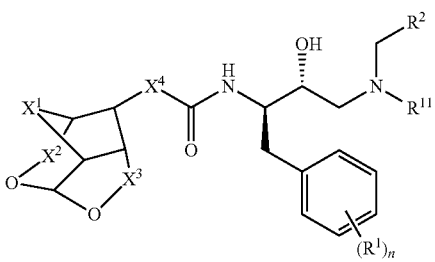

or a pharmaceutically acceptable salt, polymorph, prodrug, solvate or clathrate thereof, wherein X$^1$, X$^2$, X$^3$, X$^4$, R$^1$, R$^2$, R$^{11}$, and n are defined herein.

In any of the compounds described herein (e.g, formula (I) and (Ia)-(Ih)), X$^1$ can be alkylene, for example, C$_1$-C$_4$ alkylene, including —CH$_2$— and —CH$_2$CH$_2$—.

In addition or alternatively, X$^2$ can be alkylene, for example, C$_1$-C$_4$ alkylene, including —CH$_2$— and —CH$_2$CH$_2$—.

In addition or alternatively X$^3$ can be alkylene, for example, C$_1$-C$_4$ alkylene, including —CH$_2$ and —CH$_2$CH$_2$—.

In addition or alternatively, X$^4$ can be alkylene, for example, C$_1$-C$_4$ alkylene, including —CH$_2$— and —CH$_2$CH$_2$—.

For example, X$^1$, X$^2$, X$^3$, and X$^4$ can all be —CH$_2$—; or X$^1$ is —CH$_2$—; X$^2$ is —CH$_2$—; X$^3$ is —CH$_2$CH$_2$—, and X$^4$ is —CH$_2$; X$^1$ is —CH$_2$—; X$^2$ is —CH$_2$CH$_2$—; X$^3$ is —CH$_2$—, and X$^4$ is —CH$_2$—; or X$^1$ is —CH$_2$CH$_2$—; X$^2$ is —CH$_2$—; X$^3$ is —CH$_2$—, and X$^4$ is —CH$_2$—.

In addition or alternatively, R$^1$ can be C$_1$-C$_6$ alkoxy, hydroxy-C$_1$-C$_6$-alkyl, halo or C$_1$-C$_6$-heterocyclyl-C$_1$-C$_6$-alkyloxy. Non-limiting examples of R$^1$ groups include —OCH₃ (e.g., at the 3- or 4-position of the aromatic ring), —CH₂OH (e.g., at the 3- or 4-position of the aromatic ring), fluoro (e.g., at the 3- or 4-position of the aromatic ring or at the 3 and 5 position of the aromatic ring, such that the ring is 3,5-difluorosubstituted), —O—CH₂CH₂morpholine (e.g., at the 3- or 4-position of the aromatic ring). In addition or alternatively, $R^2$ is $C_1$-$C_6$ alkyl, halo-$C_1$-$C_6$-alkyl, $C_6$-$C_{10}$-aryl-$C_1$-$C_6$-alkyl, $C_3$-$C_6$-cycloalkyl-$C_1$-$C_6$-alkyl, $C_3$-$C_6$-heterocyclylcarbonyl or $C_3$-$C_6$-heterocyclyl-$C_1$-$C_6$-alkyl. Non-limiting examples of $R^2$ groups include —CH(CH₃)₂, —CF(CH₃)₂, —CH₂cyclopentyl, C(Me)cyclopropyl, C(Me)cyclobutyl, C(Me)cyclopentyl, C(Me)tetrahydrofuranyl, —CH₂prolyl, and —CH₂tetrahydrofuranyl (e.g., —CH₂tetrahydrofuran-2-yl).

In addition or alternatively, n is 0 such that the phenyl ring to which $R^1$ is attached is unsubstituted; n is greater than 0, but less than 3 (e.g., 1 to 3 or 2 to 3) such that the phenyl ring to which $R^1$ is attached is mono-, di- or tri-substituted. When n is greater than 0, the substituents on the phenyl ring to which $R^1$ is attached is substituted with halo or alkoxy, such as mono-, di- or tri-substituted with fluoro; or tri-substituted with two fluoro groups and one alkoxy group.

In addition or alternatively, $R^2$ is alkyl (e.g., $C_1$-$C_6$ alkyl); $R^2$ is a heterocyclyl group that can be substituted, such as a pyrrolidinyl or azetidinyl group (when, substituted, the heterocyclyl group can be substituted with alkyl (e.g., $C_1$-$C_6$ alkyl)); $R^2$ is a —C(R⁷R⁶)-alkylene-R⁹ group, wherein the alkylene is a $C_1$-$C_5$ alkylene, such as a $C_2$-$C_5$ alkylene or a $C_3$-$C_4$ alkylene (wherein $R^9$ can be —OC(O)N(R¹⁰)₂ or —(CH₂)₀₋₂N(R¹⁰)C(O)OR¹⁰, wherein $R^{10}$ is defined herein); or $R^2$ is aryl that can be substituted with, e.g., a heterocyclyl group, such as a heteroaryl group. In some embodiments, the heteroaryl group is a pyridinyl group.

In addition or alternatively, $R^{11}$ is —SO₂R³, wherein $R^3$ is aryl, wherein the aryl can be substituted one or more times with, among other groups, an alkenyl group, a cycloalkyl group, a heterocyclyl group, (CH₂)₀₋₄B(OR)₂, (CH₂)₀₋₄P(O)(OR)₂ or (CH₂)₀₋₄O(CH₂)₀₋₄P(O)(OR)₂, each of which, in turn can be substituted. When $R^3$ is aryl substituted with heterocyclyl, the heterocyclyl group can be a heteroaryl group, such as a 4,5-dihydrooxazolyl, oxazolyl, oxadiazolyl, indolyl, and isoindolyl group. When substituted, the heterocyclyl group can be substituted, for example, with one or more groups selected from the group consisting of alkyl (e.g., $C_1$-$C_6$ alkyl), —C(O)R, —CF₃, -alkylene-NR₂, —NR₂, and —OR, wherein R is defined herein. In addition or alternatively, $R^3$ can be substituted $C_6$-$C_{10}$ aryl. For example, $R^3$ can be substituted phenyl, substituted with, for example, at least one of amino (e.g., —NH₂), $C_1$-$C_6$ alkoxy (e.g., —OCH₃), hydroxy-$C_1$-$C_6$-alkyl (e.g., —CH₂OH) and halo (e.g., fluoro).

Examples of cycloalkyl groups that can be substituents on the aryl of $R^3$ include, for example, cyclopropyl, cyclobutyl, and cyclopentyl groups. When substituted, the cycloalkyl group can be substituted with, for example, one or more groups selected from the group consisting of —CN, —OR, -alkylene-NR₂, —NR₂ or —C(O)N(R)₂, wherein R is defined herein.

When substituted, the alkenyl group (e.g., $C_1$-$C_6$ alkenyl) can be substituted with, for example, alkyl, -alkyl-NR₂ or —C(O)N(R)₂.

Alternatively, $R^3$ can be $C_6$-$C_8$ heteroaryl, such as substituted heteroaryl. For example, $R^3$ can be substituted $C_6C_8$ heteroaryl having the formula:

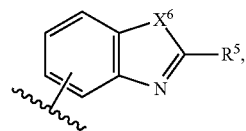

wherein $R^5$ is $C_1$-$C_6$ alkylamino or $C_3$-$C_6$ cycloalkyl-$C_3$-$C_6$ heterocycloamino; and $X^6$ is S, O or NR⁶, wherein $R^6$ is H, alkyl, cycloalkyl or alkylaryl. Non-limiting examples of $R^5$ include —NHCH₃, —NHCH(CH₃)₂, -NHcyclopropyl, —NHCH₂CH(CH₃)₂, and —NHC(CH₃)₃. For example, $R^3$ can be substituted $C_6$-$C_8$ heteroaryl having the formula:

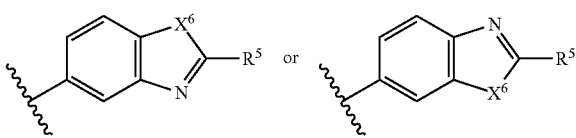

wherein $R^5$ can be $C_1$-$C_6$ alkylamino or $C_3$-$C_6$ cycloalkyl-$C_3$-$C_6$ heterocycloamino; and $X^4$ is S, O or NR⁶, wherein $R^6$ is H, alkyl, cycloalkyl or alkylaryl.

Alternatively, $R^{11}$ can be —C(O)N(R¹²)₂, wherein each $R^{12}$ is, independently, hydrogen, alkyl (e.g., $C_1$-$C_6$ alkyl), aryl, heterocyclyl or the two $R^{12}$ groups, together with the nitrogen atom to which they are attached, form a heterocyclyl group. For example, the two $R^{12}$ groups, together with the nitrogen atom to which they are attached, form a heterocyclyl group, such as a piperidinyl group, which can be substituted.

Examples of the compounds of the formula (I) and (Ia)-(Ih) include, but are not limited to:

9

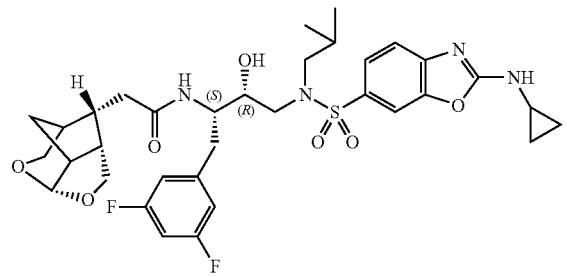

10

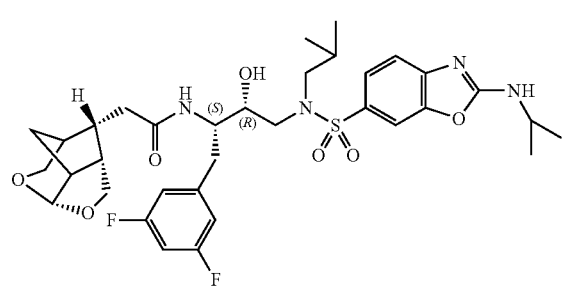

11
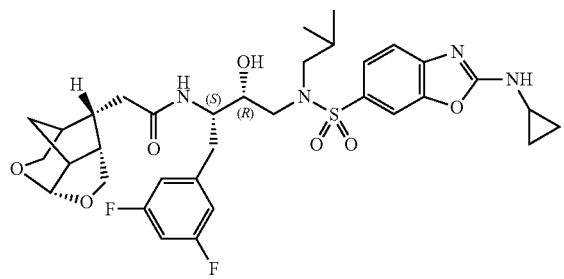
12
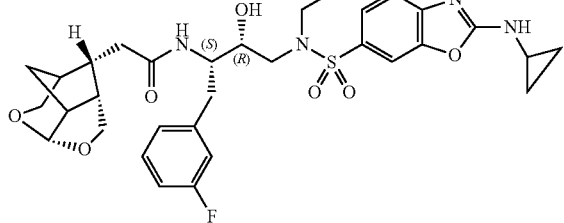
13
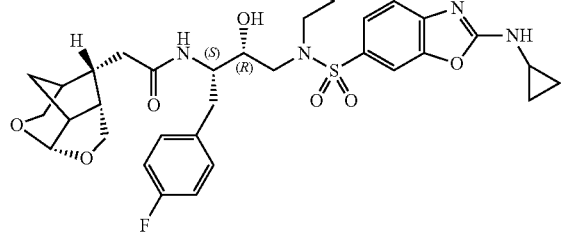
14
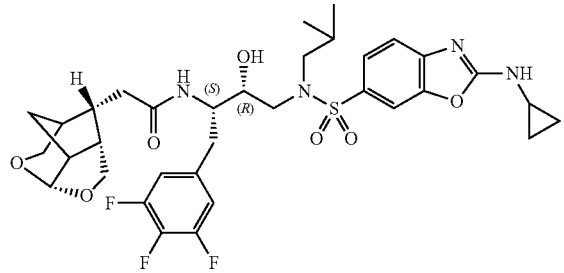
15
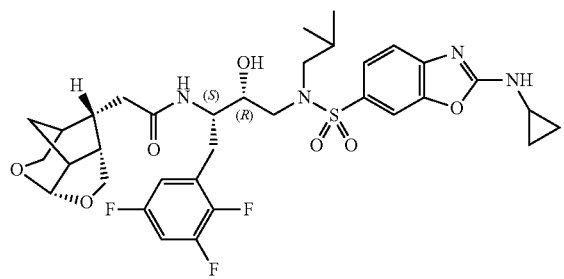
16
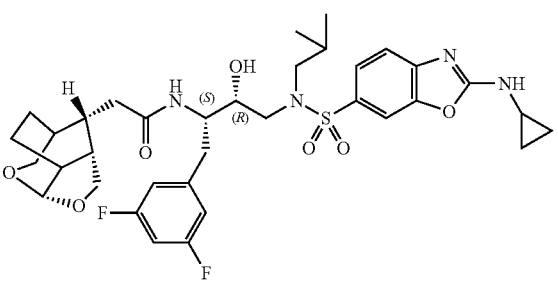
17
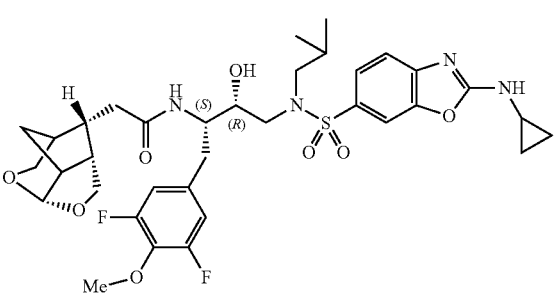
18
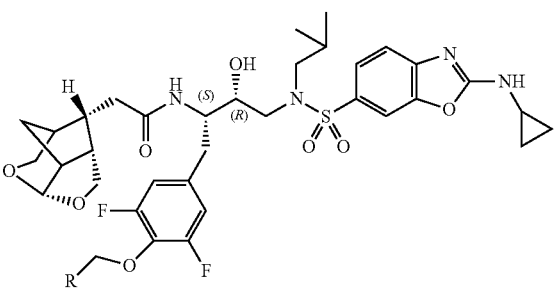
or a pharmaceutically acceptable salt, polymorph, prodrug, solvate or clathrate thereof. Although specific relative stereochemistries are indicated, all diastereomers of these compound are contemplated herein.
Other examples of the compounds of the formula (I) and (Ia)-(Ih) include, but are not limited to:
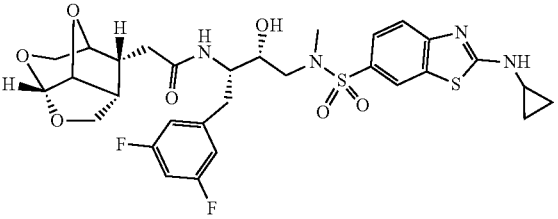
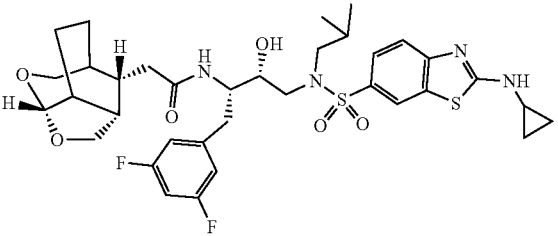

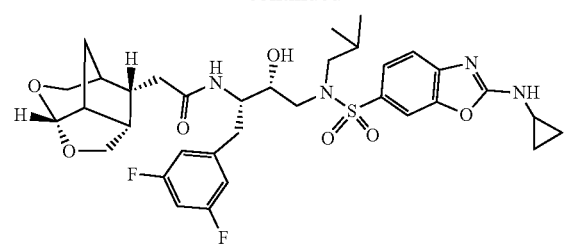
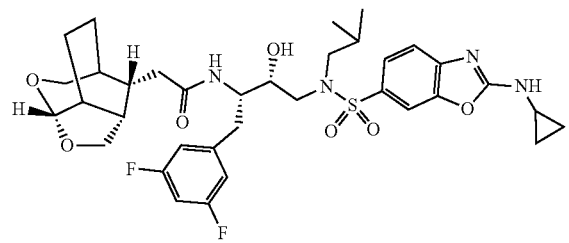
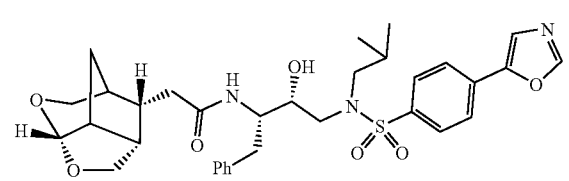
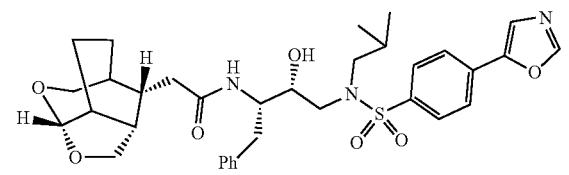
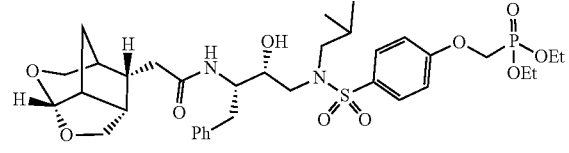
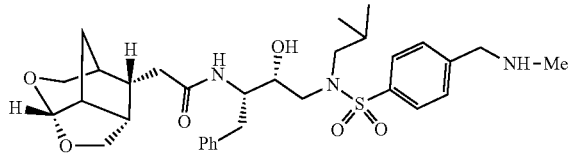
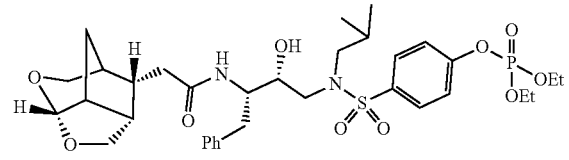
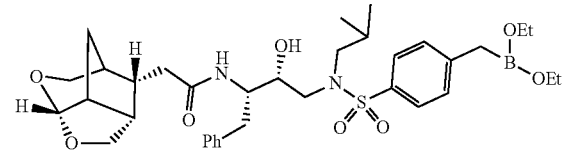
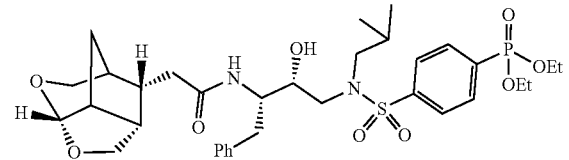
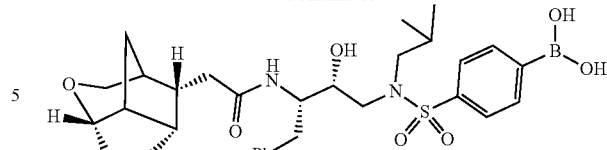
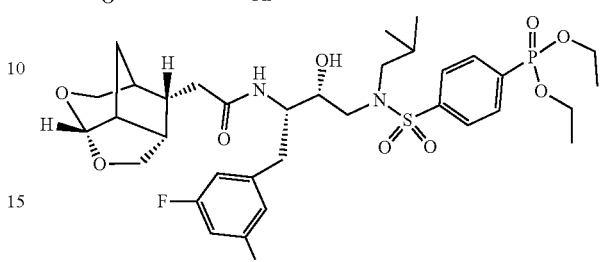
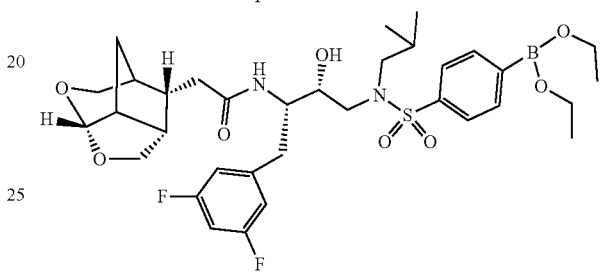
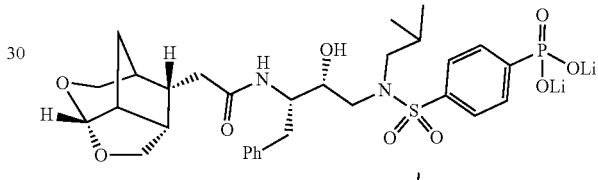
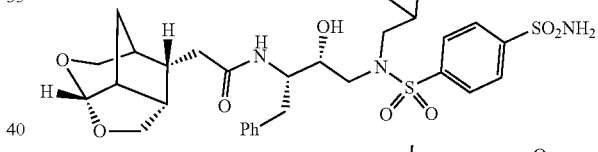
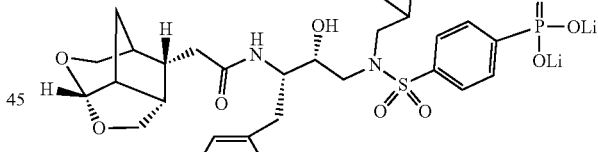
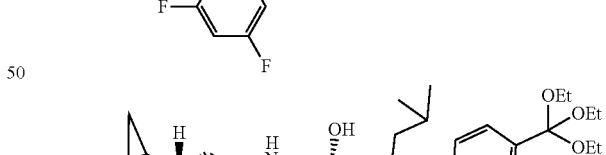
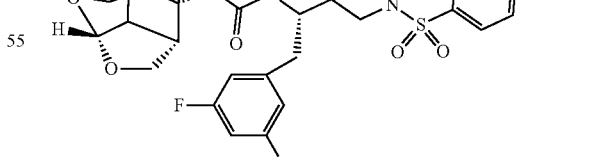
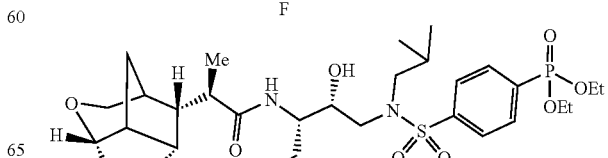

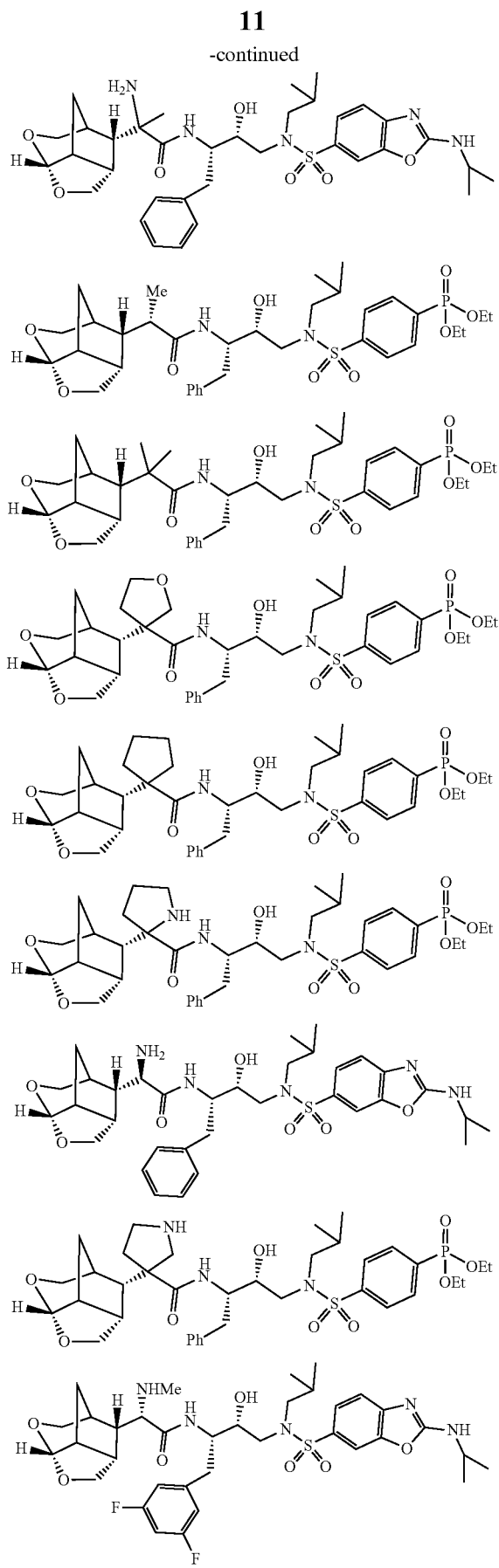
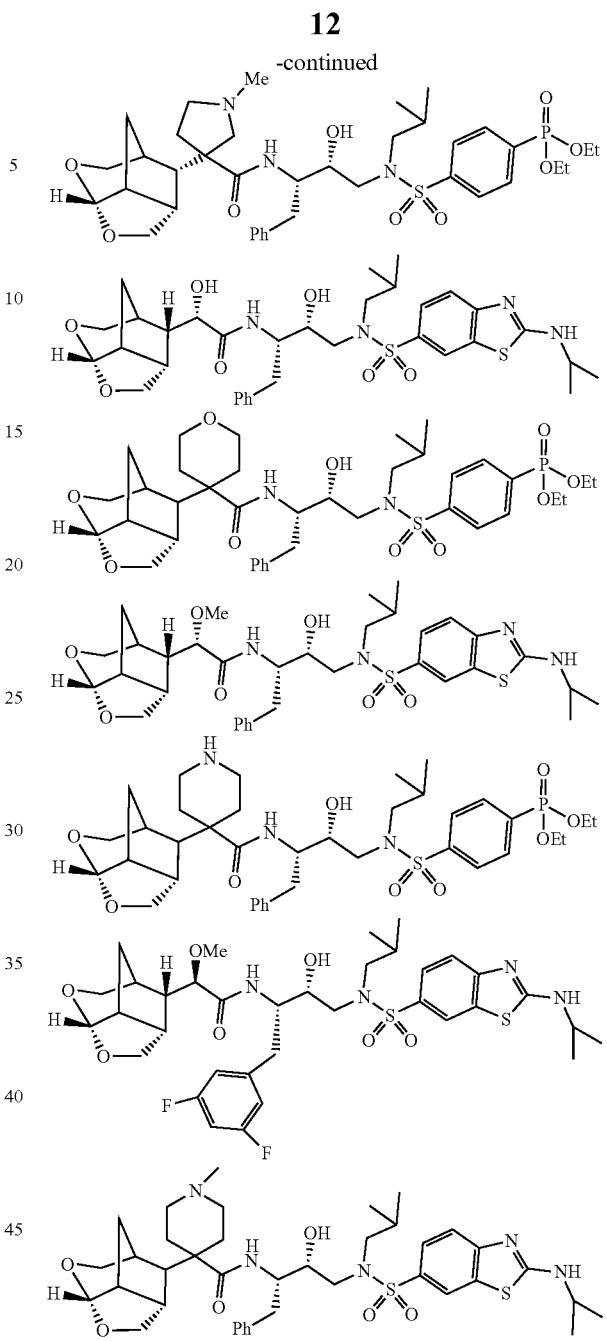

or a pharmaceutically acceptable salt, polymorph, prodrug, solvate or clathrate thereof. Although specific relative stereochemistries are indicated, all diastereomers of these compound are contemplated herein.

Those of ordinary skill in the art will recognize that compounds described herein (e.g., the compounds of the formula (I) and (Ia)-(Ih)) contain chiral centers. All diastereomers of the compounds described herein are contemplated herein, as well as racemates. Thus, for example, the compounds of formula (I) and (Ia)-(Ih) are contemplated herein, as well as racemates.

The present invention also provides a pharmaceutical composition comprising a compound of any of the preceding formulae and a pharmaceutically acceptable carrier. The present invention also provides a pharmaceutical composition comprising a therapeutically effective amount of one or more compounds of the formula (I) and (Ia)-(Ih), and a pharmaceutically acceptable carrier.

Pharmaceutical compositions contemplated herein are those comprising one or more compounds of the various embodiments of the present invention and one or more pharmaceutically acceptable excipients. A "pharmaceutical composition" refers to a chemical or biological composition suitable for administration to a subject (e.g., mammal). Such compositions can be specifically formulated for administration via one or more of a number of routes, including but not limited to buccal, cutaneous, epicutaneous, epidural, infusion, inhalation, intraarterial, intracardial, intracerebroventricular, intradermal, intramuscular, intranasal, intraocular, intraperitoneal, intraspinal, intrathecal, intravenous, oral, parenteral, pulmonary, rectally via an enema or suppository, subcutaneous, subdermal, sublingual, transdermal, and transmucosal. In addition, administration can by means of capsule, drops, foams, gel, gum, injection, liquid, patch, pill, porous pouch, powder, tablet, or other suitable means of administration.

A "pharmaceutical excipient" or a "pharmaceutically acceptable excipient" is a carrier, sometimes a liquid, in which an active therapeutic agent is formulated. The excipient generally does not provide any pharmacological activity to the formulation, though it can provide chemical and/or biological stability, and release characteristics. Examples of suitable formulations can be found, for example, in Remington, The Science And Practice of Pharmacy, 20th Edition, (Gennaro, A. R., Chief Editor), Philadelphia College of Pharmacy and Science, 2000, which is incorporated by reference in its entirety.

As used herein "pharmaceutically acceptable carrier" or "excipient" includes, but is not limited to, any and all solvents, dispersion media, coatings, antibacterial and antifungal agents, isotonic and absorption delaying agents that are physiologically compatible. In one embodiment, the carrier is suitable for parenteral administration. Alternatively, the carrier can be suitable for intravenous, intraperitoneal, intramuscular, sublingual, or oral administration. Pharmaceutically acceptable carriers include sterile aqueous solutions or dispersions and sterile powders for the extemporaneous preparation of sterile injectable solutions or dispersion. The use of such media and agents for pharmaceutically active substances is well known in the art. Except insofar as any conventional media or agent is incompatible with the active compound, use thereof in the pharmaceutical compositions of the invention is contemplated. Supplementary active compounds can also be incorporated into the compositions.

Pharmaceutical compositions can be sterile and stable under the conditions of manufacture and storage. The composition can be formulated as a solution, microemulsion, liposome, or other ordered structure suitable to high drug concentration. The carrier can be a solvent or dispersion medium containing, for example, water, ethanol, polyol (e.g., glycerol, propylene glycol, and liquid polyethylene glycol), and suitable mixtures thereof. The proper fluidity can be maintained, for example, by the use of a coating such as lecithin, by the maintenance of the required particle size in the case of dispersion and by the use of surfactants.

In many cases, it will be preferable to include isotonic agents, for example, sugars, polyalcohols such as mannitol, sorbitol, or sodium chloride in the composition. Prolonged absorption of injectable compositions can be brought about by including in the composition an agent which delays absorption, for example, monostearate salts and gelatin. Moreover, the compounds described herein can be formulated in a time release formulation, for example in a composition that includes a slow release polymer. The active compounds can be prepared with carriers that will protect the compound against rapid release, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, polylactic acid and polylactic, polyglycolic copolymers (PLG). Many methods for the preparation of such formulations are known to those skilled in the art.

Oral forms of administration are also contemplated herein. The pharmaceutical compositions of the present invention can be orally administered as a capsule (hard or soft), tablet (film coated, enteric coated or uncoated), powder or granules (coated or uncoated) or liquid (solution or suspension). The formulations can be conveniently prepared by any of the methods well-known in the art. The pharmaceutical compositions of the present invention can include one or more suitable production aids or excipients including fillers, binders, disintegrants, lubricants, diluents, flow agents, buffering agents, moistening agents, preservatives, colorants, sweeteners, flavors, and pharmaceutically compatible carriers.

For each of the recited embodiments, the compounds can be administered by a variety of dosage forms as known in the art. Any biologically-acceptable dosage form known to persons of ordinary skill in the art, and combinations thereof, are contemplated. Examples of such dosage forms include, without limitation, chewable tablets, quick dissolve tablets, effervescent tablets, reconstitutable powders, elixirs, liquids, solutions, suspensions, emulsions, tablets, multi-layer tablets, bi-layer tablets, capsules, soft gelatin capsules, hard gelatin capsules, caplets, lozenges, chewable lozenges, beads, powders, gum, granules, particles, microparticles, dispersible granules, cachets, douches, suppositories, creams, topicals, inhalants, aerosol inhalants, patches, particle inhalants, implants, depot implants, ingestibles, injectables (including subcutaneous, intramuscular, intravenous, and intradermal), infusions, and combinations thereof.

Other compounds which can be included by admixture are, for example, medically inert ingredients (e.g., solid and liquid diluent), such as lactose, dextrose-saccharose, cellulose, starch or calcium phosphate for tablets or capsules, olive oil or ethyl oleate for soft capsules and water or vegetable oil for suspensions or emulsions; lubricating agents such as silica, talc, stearic acid, magnesium or calcium stearate and/or polyethylene glycols; gelling agents such as colloidal days; thickening agents such as gum tragacanth or sodium alginate, binding agents such as starches, arabic gums, gelatin, methylcellulose, carboxymethylcellulose or polyvinylpyrrolidone; disintegrating agents such as starch, alginic acid, alginates or sodium starch glycolate; effervescing mixtures; dyestuff; sweeteners; wetting agents such as lecithin, polysorbates or laurylsulphates; and other therapeutically acceptable accessory ingredients, such as humectants, preservatives, buffers and antioxidants, which are known additives for such formulations.

Liquid dispersions for oral administration can be syrups, emulsions, solutions, or suspensions. The syrups can contain as a carrier, for example, saccharose or saccharose with glycerol and/or mannitol and/or sorbitol. The suspensions and the emulsions can contain a carrier, for example a natural gum, agar, sodium alginate, pectin, methylcellulose, carboxymethylcellulose, or polyvinyl alcohol.

The amount of active compound in a therapeutic composition according to various embodiments of the present invention can vary according to factors such as the disease state, age, gender, weight, patient history, risk factors, predisposition to disease, administration route, pre-existing treatment regime (e.g., possible interactions with other medications), and weight of the subject. Dosage regimens can be adjusted to provide the optimum therapeutic response. For example, a single bolus can be administered, several divided doses can be administered over time, or the dose can be proportionally reduced or increased as indicated by the exigencies of therapeutic situation.

A "dosage unit form," as used herein, refers to physically discrete units suited as unitary dosages for the mammalian subjects to be treated; each unit containing a predetermined quantity of active compound calculated to produce the desired therapeutic effect in association with the required pharmaceutical carrier. The specification for the dosage unit forms of the invention are dictated by and directly dependent on the unique characteristics of the active compound and the particular therapeutic effect to be achieved, and the limitations inherent in the art of compounding such an active compound for the treatment of sensitivity in subjects. In therapeutic use for treatment of conditions in mammals (e.g., humans) for which the compounds of the present invention or an appropriate pharmaceutical composition thereof are effective, the compounds of the present invention can be administered in an effective amount. The dosages as suitable for this invention can be a composition, a pharmaceutical composition or any other compositions described herein.

For each of the recited embodiments, the dosage is typically administered once, twice, or thrice a day, although more frequent dosing intervals are possible. The dosage can be administered every day, every 2 days, every 3 days, every 4 days, every 5 days, every 6 days, and/or every 7 days (once a week). In one embodiment, the dosage can be administered daily for up to and including 30 days, preferably between 7-10 days. In another embodiment, the dosage can be administered twice a day for 10 days. If the patient requires treatment for a chronic disease or condition, the dosage can be administered for as long as signs and/or symptoms persist. The patient can require "maintenance treatment" where the patient is receiving dosages every day for months, years, or the remainder of their lives. In addition, the composition of this invention can be to effect prophylaxis of recurring symptoms. For example, the dosage can be administered once or twice a day to prevent the onset of symptoms in patients at risk, especially for asymptomatic patients.

The compositions described herein can be administered in any of the following routes: buccal, epicutaneous, epidural, infusion, inhalation, intraarterial, intracardial, intracerebroventricular, intradermal, intramuscular, intranasal, intraocular, intraperitoneal, intraspinal, intrathecal, intravenous, oral, parenteral, pulmonary, rectally via an enema or suppository, subcutaneous, subdermal, sublingual, transdermal, and transmucosal. The preferred routes of administration are buccal and oral. The administration can be local, where the composition is administered directly, close to, in the locality, near, at, about, or in the vicinity of, the site(s) of disease, e.g., inflammation, or systemic, wherein the composition is given to the patient and passes through the body widely, thereby reaching the site(s) of disease. Local administration can be administration to, for example, tissue, organ, and/or organ system, which encompasses and/or is affected by the disease, and/or where the disease signs and/or symptoms are active or are likely to occur. Administration can be topical with a local effect, composition is applied directly where its action is desired. Administration can be enteral wherein the desired effect is systemic (non-local), composition is given via the digestive tract. Administration can be parenteral, where the desired effect is systemic, composition is given by other routes than the digestive tract.

The disclosure also relates to compositions comprising a therapeutically effective amount of one or more compounds described herein (e.g. a compound of the formula (I) and (Ia)-(Ih)). Such compositions are useful in a method for treating an HIV (e.g., HIV-1) infection or AIDS, the method comprising administering a therapeutically effective amount of one or more compounds described herein to a patient in need thereof. The disclosure also relates to a one or more compounds of the formula (I) and (Ia)-(Ih) for use in the treatment HIV infection or AIDS.

The term "therapeutically effective amount" as used herein, refers to that amount of one or more compounds of the various embodiments of the present invention (e.g. a compound of the formula (I) and (Ia)-(Ih)) that elicits a biological or medicinal response in a tissue system, animal or human, that is being sought by a researcher, veterinarian, medical doctor or other clinician, which includes alleviation of the symptoms of the disease or disorder being treated. In some embodiments, the therapeutically effective amount is that which may treat or alleviate the disease or symptoms of the disease at a reasonable benefit/risk ratio applicable to any medical treatment. However, it is to be understood that the total daily usage of the compounds and compositions described herein may be decided by the attending physician within the scope of sound medical judgment. The specific therapeutically-effective dose level for any particular patient will depend upon a variety of factors, including the condition being treated and the severity of the condition; activity of the specific compound employed; the specific composition employed; the age, body weight, general health, gender and diet of the patient; the time of administration, route of administration, and rate of excretion of the specific compound employed; the duration of the treatment; drugs used in combination or coincidentally with the specific compound employed; and like factors well known to the researcher, veterinarian, medical doctor or other clinician. It is also appreciated that the therapeutically effective amount can be selected with reference to any toxicity, or other undesirable side effect, that might occur during administration of one or more of the compounds described herein.

The compounds of this disclosure can and do have an HIV-1 protease inhibition constant ($K_i$) of from about 1 fM to about 200 nM (e.g., about 1 pM to about 100 nM, about 1 pM to about 200 nM, about 1 pM to about 100 pM, about 100 fM to about 200 nM, about 100 fM to about 100 pM, about 250 fM to about 100 pM, about 500 fM to about 5 pM, about 5 pM to about 100 pM, about 50 pM to about 250 pM, about 500 pM to about 100 nM or about 300 pM to about 75 nM). In addition or alternatively, the compounds of the disclosure can and do have an antiviral activity in vitro against a wild-type laboratory strain, HIV-1$_{LAI}$ with half-maximal inhibitory concentration ($IC_{50}$) of from about 1 fM to about 200 nM (e.g., about 1 pM to about 100 nM, about 1 pM to about 200 nM, about 1 pM to about 100 pM, about 100 fM to about 200 nM, about 100 fM to about 100 pM, about 250 fM to about 100 pM, about 500 fM to about 5 pM, from about 10 pM to about 50 nM, about 10 pM to about 500 pM, about 100 pM to about 750 pM, about 500 pM to about 1 nM or about 500 pM to about 50 nM). In addition or alternatively, the compounds of the disclosure can and do have a darunavir-resistant HIV-1 variants (e.g., NL4-3R, $DRV_RP20$, $DRV_RP30$, and $DRV_RP51$) antiviral $IC_{50}$ of from about 200 fM to about 100 nM (e.g., about 1 pM to about 100 nM, about 200 fM to about 600 fM, about 200 fM to about 50 pM, about 500 fM to about 500 pM, about 300 fM to about 1 pM). In addition or alternatively, the compounds of the disclosure can and do have a darunavir-resistant HIV-1 variants (e.g., NL4-3R, $DRV_RP20$, $DRV_RP30$, and $DRV_RP51$) $IC_{50}$ of from about 50 pM to about 50 nM (e.g., about 1 pM to about 100 nM, about 100 pM to about 50 nM or about 500 pM to about 10 nM). In addition or alternatively the compounds of the disclosure can and do have a darunavir-resistant HIV-1 protease (e.g., NL4-3R, $DRV_RP20$, $DRV_RP30$, and $DRV_RP51$) antiviral $IC_{50}$ of from about 1 nM to about 100 nM (e.g., from about 10 nM to about 75 nM or about 10 nM to about 75 nM).

The term "alkyl" as used herein refers to substituted or unsubstituted straight chain, branched and cyclic, saturated mono- or bi-valent groups, which can be referred to herein as "alkylene," having from 1 to 20 carbon atoms, 10 to 20 carbon atoms, 12 to 18 carbon atoms, 6 to about 10 carbon atoms, 1 to 10 carbons atoms, 1 to 8 carbon atoms, 2 to 8 carbon atoms, 3 to 8 carbon atoms, 4 to 8 carbon atoms, 5 to 8 carbon atoms, 1 to 6 carbon atoms, 2 to 6 carbon atoms, 3 to 6 carbon atoms, or 1 to 3 carbon atoms. Examples of straight chain mono-valent ($C_1$-$C_{20}$)-alkyl groups include those with from 1 to 8 carbon atoms such as methyl (i.e., $CH_3$), ethyl, n-propyl, n-butyl, n-pentyl, n-hexyl, n-heptyl, n-octyl groups. Examples of branched mono-valent ($C_1$-$C_{20}$)-alkyl groups include isopropyl, iso-butyl, sec-butyl, t-butyl, neopentyl, and isopentyl. Examples of straight chain bi-valent ($C_1$-$C_{20}$)alkyl groups include those with from 1 to 6 carbon atoms such as —$CH_2$—, —$CH_2CH_2$—, —$CH_2CH_2CH_2$—, —$CH_2CH_2CH_2CH_2$—, and —$CH_2CH_2CH_2CH_2CH_2$—. Examples of branched bi-valent alkyl groups include —$CH(CH_3)CH_2$— and —$CH_2CH(CH_3)CH_2$—. Examples of cyclic alkyl groups include cyclopropyl, cyclobutyl, cyclopently, cyclohexyl, cyclooctyl, bicyclo[1.1.1]pentyl, bicyclo[2.1.1]hexyl, and bicyclo[2.2.1]heptyl. Cycloalkyl groups further include polycydic cycloalkyl groups such as, but not limited to, norbornyl, adamantyl, bornyl, camphenyl, isocamphenyl, and carenyl groups, and fused rings such as, but not limited to, decalinyl, and the like. In some embodiments, alkyl includes a combination of substituted and unsubstituted alkyl. As an example, alkyl, and also ($C_1$)alkyl, includes methyl and substituted methyl. As a particular example, ($C_1$)alkyl includes benzyl. As a further example, alkyl can include methyl and substituted ($C_2$-$C_8$)alkyl. Alkyl can also include substituted methyl and unsubstituted ($C_2$-$C_8$)alkyl. In some embodiments, alkyl can be methyl and $C_2$-$C_8$ linear alkyl. In some embodiments, alkyl can be methyl and $C_2$-$C_8$ branched alkyl. The term methyl is understood to be —$CH_3$, which is not substituted. The term methylene is understood to be —$CH_2$—, which is not substituted. For comparison, the term ($C_1$)alkyl is understood to be a substituted or an unsubstituted —$CH_3$ or a substituted or an unsubstituted —$CH_2$—. Representative substituted alkyl groups can be substituted one or more times with any of the groups listed herein, for example, cycloalkyl, heterocyclyl, aryl, amino, haloalkyl, hydroxy, cyano, carboxy, nitro, thio, alkoxy, and halogen groups. As further example, representative substituted alkyl groups can be substituted one or more fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonyl, alkylsulfinyl, dialkylaminosulfonyl, sulfonic acid, carboxylic acid, dialkylamino and dialkylamido. Examples of substituted alkyl groups include alkyl groups substituted with halo, amino, hydroxy, cyano, carboxy, nitro, thio and alkoxy. For example, representative substituted alkyl groups can be substituted with a fluoro group. In some embodiments, representative substituted alkyl groups can be substituted with one, two, three or more fluoro groups or they can be substituted with one, two, three or more non-fluoro groups. For example, alkyl can be trifluoromethyl, difluoromethyl, or fluoromethyl, or alkyl can be substituted alkyl other than trifluoromethyl, difluoromethyl or fluoromethyl. Alkyl can be haloalkyl or alkyl can be substituted alkyl other than haloalkyl. The term "alkyl" also generally refers to alkyl groups that can comprise one or more heteroatoms in the carbon chain, including nitrogen and oxygen. Thus, for example, "alkyl" also encompasses groups such as —$(CH_2)_pO]_qH$ and the like.

The term "alkenyl" as used herein refers to substituted or unsubstituted straight chain, branched and cyclic, saturated mono- or bi-valent groups having at least one carbon-carbon double bond and from 2 to 20 carbon atoms, 10 to 20 carbon atoms, 12 to 18 carbon atoms, 6 to about 10 carbon atoms, 2 to 10 carbon atoms, 2 to 8 carbon atoms, 3 to 8 carbon atoms, 4 to 8 carbon atoms, 5 to 8 carbon atoms, 2 to 6 carbon atoms, 3 to 6 carbon atoms, 4 to 6 carbon atoms, 2 to 4 carbon atoms, or 2 to 3 carbon atoms. The double bonds can be trans or cis orientation. The double bonds can be terminal or internal. The alkenyl group can be attached via the portion of the alkenyl group containing the double bond, e.g., vinyl, propen-1-yl and buten-1-yl, or the alkenyl group can be attached via a portion of the alkenyl group that does not contain the double bond, e.g., penten-4-yl. Examples of mono-valent ($C_2$-$C_{20}$)-alkenyl groups include those with from 1 to 8 carbon atoms such as vinyl, propenyl, propen-1-yl, propen-2-yl, butenyl, buten-1-yl, buten-2-yl, sec-buten-1-yl, sec-buten-3-yl, pentenyl, hexenyl, heptenyl and octenyl groups. Examples of branched mono-valent ($C_2$-$C_{20}$)-alkenyl groups include isopropenyl, iso-butenyl, sec-butenyl, t-butenyl, neopentenyl, and isopentenyl. Examples of straight chain bi-valent ($C_2$-$C_{20}$)alkenyl groups include those with from 2 to 6 carbon atoms such as —CHCH—, —CHCHCH$_2$—, —CHCHCH$_2$CH$_2$—, and —CHCHCH$_2$CH$_2$CH$_2$—. Examples of branched bi-valent alkyl groups include —C(CH$_3$)CH— and —CHC(CH$_3$)CH$_2$—. Examples of cyclic alkenyl groups include cyclopentenyl, cyclohexenyl and cyclooctenyl. It is envisaged that alkenyl can also include masked alkenyl groups, precursors of alkenyl groups or other related groups. As such, where alkenyl groups are described it, compounds are also envisaged where a carbon-carbon double bond of an alkenyl is replaced by an epoxide or aziridine ring. Substituted alkenyl also includes alkenyl groups which are substantially tautomeric with a non-alkenyl group. For example, substituted alkenyl can be 2-aminoalkenyl, 2-alkylaminoalkenyl, 2-hydroxyalkenyl, 2-hydroxyvinyl, 2-hydroxypropenyl, but substituted alkenyl is also understood to include the group of substituted alkenyl groups other than alkenyl which are tautomeric with non-alkenyl containing groups. In some embodiments, alkenyl can be understood to include a combination of substituted and unsubstituted alkenyl. For example, alkenyl can be vinyl and substituted vinyl. For example, alkenyl can be vinyl and substituted ($C_3$-$C_8$) alkenyl. Alkenyl can also include substituted vinyl and unsubstituted ($C_3$-$C_8$)alkenyl. Representative substituted alkenyl groups can be substituted one or more times with any of the groups listed herein, for example, monoalkylamino, dialkylamino, cyano, acetyl, amido, carboxy, nitro, alkylthio, alkoxy, and halogen groups. As further example, representative substituted alkenyl groups can be substituted one or more fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonyl, alkylsulfinyl, dialkylaminosulfonyl, sulfonic acid, carboxylic acid, dialkylamino and dialkylamido. In some embodiments, representative substituted alkenyl groups can be substituted from a set of groups including monoalkylamino, dialkylamino, cyano, acetyl, amido, carboxy, nitro, alkylthio and alkoxy, but not including halogen groups. Thus, in some embodiments alkenyl can be substituted with a non-halogen group. In some embodiments, representative substituted alkenyl groups can be substituted with a fluoro group, substituted with a bromo group, substituted with a halogen other than bromo, or substituted with a halogen other than fluoro. For example, alkenyl can be 1-fluorovinyl, 2-fluorovinyl, 1,2-difluorovinyl, 1,2,2-trifluorovinyl, 2,2-difluorovinyl, trifluoropropen-2-yl, 3,3,3-trifluoropropenyl, 1-fluoropropenyl, 1-chlorovinyl, 2-chlorovinyl, 1,2-dichlorovinyl, 1,2,2-trichlorovinyl or 2,2-dichlorovinyl. In some embodiments, representative substituted alkenyl groups can be substituted with one, two, three or more fluoro groups or they can be substituted with one, two, three or more non-fluoro groups.

The term "alkynyl" as used herein, refers to substituted or unsubstituted straight and branched chain alkyl groups, except that at least one triple bond exists between two carbon atoms. Thus, alkynyl groups have from 2 to 50 carbon atoms, 2 to 20 carbon atoms, 10 to 20 carbon atoms, 12 to 18 carbon atoms, 6 to about 10 carbon atoms, 2 to 10 carbons atoms, 2 to 8 carbon atoms, 3 to 8 carbon atoms, 4 to 8 carbon atoms, 5 to 8 carbon atoms, 2 to 6 carbon atoms, 3 to 6 carbon atoms, 4 to 6 carbon atoms, 2 to 4 carbon atoms, or 2 to 3 carbon atoms. Examples include, but are not limited to ethynyl, propynyl, propyn-1-yl, propyn-2-yl, butynyl, butyn-1-yl, butyn-2-yl, butyn-3-yl, butyn-4-yl, pentynyl, pentyn-1-yl, hexynyl, Examples include, but are not limited to —C≡CH, —C≡C(CH₃), —C≡C(CH₂CH₃), —CH₂C≡CH, —CH₂C≡C(CH₃), and —CH₂C≡C(CH₂CH₃) among others.

The term "aryl" as used herein refers to substituted or unsubstituted univalent groups that are derived by removing a hydrogen atom from an arene, which is a cyclic aromatic hydrocarbon, having from 6 to 20 carbon atoms, 10 to 20 carbon atoms, 12 to 20 carbon atoms, 6 to about 10 carbon atoms or 6 to 8 carbon atoms. Examples of $(C_6-C_{20})$aryl groups include phenyl, napthalenyl, azulenyl, biphenylyl, indacenyl, fluorenyl, phenanthrenyl, triphenylenyl, pyrenyl, naphthacenyl, chrysenyl, anthracenyl groups. Examples include substituted phenyl, substituted napthalenyl, substituted azulenyl, substituted biphenylyl, substituted indacenyl, substituted fluorenyl, substituted phenanthrenyl, substituted triphenylenyl, substituted pyrenyl, substituted naphthacenyl, substituted chrysenyl, and substituted anthracenyl groups. Examples also include unsubstituted phenyl, unsubstituted napthalenyl, unsubstituted azulenyl, unsubstituted biphenylyl, unsubstituted indacenyl, unsubstituted fluorenyl, unsubstituted phenanthrenyl, unsubstituted triphenylenyl, unsubstituted pyrenyl, unsubstituted naphthacenyl, unsubstituted chrysenyl, and unsubstituted anthracenyl groups. Aryl includes phenyl groups and also non-phenyl aryl groups. From these examples, it is clear that the term $(C_6-C_{20})$aryl encompasses mono- and polycyclic $(C_6-C_{20})$aryl groups, including fused and non-fused polycyclic $(C_6-C_{20})$aryl groups.

The term "heterocyclyl" as used herein refers to substituted aromatic, unsubstituted aromatic, substituted non-aromatic, and unsubstituted non-aromatic rings containing 3 or more atoms in the ring, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. In some embodiments, heterocyclyl groups include heterocyclyl groups that include 3 to 8 carbon atoms $(C_3-C_8)$, 3 to 6 carbon atoms $(C_3-C_6)$ or 6 to 8 carbon atoms $(C_6-C_8)$. A heterocyclyl group designated as a $C_2$-heterocyclyl can be a 5-membered ring with two carbon atoms and three heteroatoms, a 6-membered ring with two carbon atoms and four heteroatoms and so forth. Likewise a $C_4$-heterocyclyl can be a 5-membered ring with one heteroatom, a 6-membered ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. Representative heterocyclyl groups include, but are not limited to piperidynyl, piperazinyl, morpholinyl, furanyl, pyrrolidinyl, pyridinyl, pyrazinyl, pyrimidinyl, triazinyl, thiophenyl, tetrahydrofuranyl, pyrrolyl, oxazolyl, imidazolyl, triazyolyl, tetrazolyl, benzoxazolinyl, and benzimidazolinyl groups. For example, heterocyclyl groups include, without limitation:

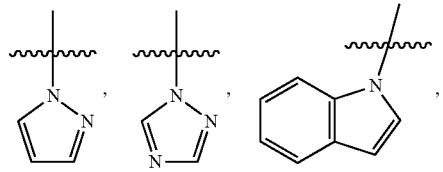

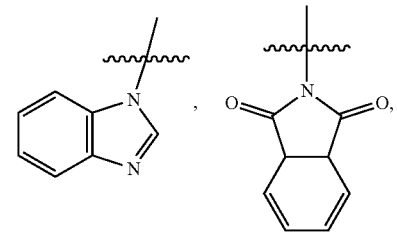

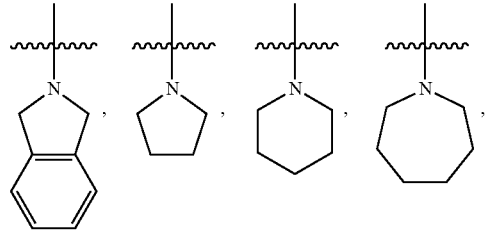

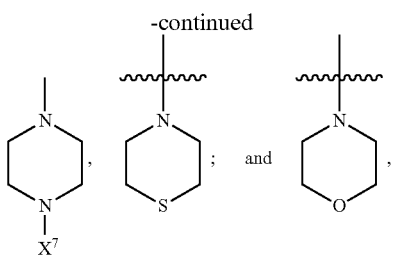

wherein X⁷ represents H, $(C_1-C_{20})$alkyl, $(C_6-C_{20})$aryl or an amine protecting group (e.g., a t-butyloxycarbonyl group) and wherein the heterocyclyl group can be substituted or unsubstituted. A nitrogen-containing heterocyclyl group is a heterocyclyl group containing a nitrogen atom as an atom in the ring. In some embodiments, the heterocyclyl is other than thiophene or substituted thiophene. In some embodiments, the heterocyclyl is other than furan or substituted furan.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. Thus, alkyoxy also includes an oxygen atom connected to an alkyenyl group and oxygen atom connected to an alkynyl group. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "aryloxy" as used herein refers to an oxygen atom connected to an aryl group as are defined herein.

The term "aralkyl" and "arylalkyl" as used herein refers to alkyl groups as defined herein in which a hydrogen or carbon bond of an alkyl group is replaced with a bond to an aryl group as defined herein. Representative aralkyl groups include benzyl, biphenylmethyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The terms "halo," "halogen," or "halide" group, as used herein, by themselves or as part of another substituent, mean, unless otherwise stated, a fluorine, chlorine, bromine, or iodine atom.

The term "amine" and "amino" as used herein refers to a substituent of the form —NH₂, —NHR, —NR₂, —NR₃⁺, wherein each R is independently selected, and protonated forms of each, except for —NR₃⁺, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The term "acyl" as used herein refers to a group containing a carbonyl moiety wherein the group is bonded via the carbonyl carbon atom. The carbonyl carbon atom is also bonded to another carbon atom, which can be part of a substituted or unsubstituted alkyl, alkenyl, alkynyl, aryl, cycloalkyl, heterocyclyl, group or the like.

The term "formyl" as used herein refers to a group containing a carbonyl moiety wherein the group is bonded via the carbonyl carbon atom. The carbonyl carbon atom is also bonded to a hydrogen atom.

The term "alkoxycarbonyl" as used herein refers to a group containing a carbonyl moiety wherein the group is bonded via the carbonyl carbon atom. The carbonyl carbon atom is also bonded to an oxygen atom which is further bonded to an alkyl group. Alkoxycarbonyl also includes the group where a carbonyl carbon atom is also bonded to an oxygen atom which is further bonded to an alkyenyl group. Alkoxycarbonyl also includes the group where a carbonyl carbon atom is also bonded to an oxygen atom which is further bonded to an alkynyl group. In a further case, which is included in the definition of alkoxycarbonyl as the term is defined herein, and is also included in the term "aryloxycarbonyl," the carbonyl carbon atom is bonded to an oxygen atom which is bonded to an aryl group instead of an alkyl group.

The term "arylcarbonyl" as used herein refers to a group containing a carbonyl moiety wherein the group is bonded via the carbonyl carbon atom. The carbonyl carbon atom is also bonded to an aryl group.

The term "alkylamido" as used herein refers to a group containing a carbonyl moiety wherein the group is bonded via the carbonyl carbon atom. The carbonyl carbon atom is also bonded to a nitrogen group which is bonded to one or more alkyl groups. In a further case, which is also an alkylamido as the term is defined herein, the carbonyl carbon atom is bonded to a nitrogen atom which is bonded to one or more aryl group instead of, or in addition to, the one or more alkyl group. In a further case, which is also an alkylamido as the term is defined herein, the carbonyl carbon atom is bonded to an nitrogen atom which is bonded to one or more alkenyl group instead of, or in addition to, the one or more alkyl and or/aryl group. In a further case, which is also an alkylamido as the term is defined herein, the carbonyl carbon atom is bonded to a nitrogen atom which is bonded to one or more alkynyl group instead of, or in addition to, the one or more alkyl, alkenyl and/or aryl group.

The term "carboxy" as used herein refers to a group containing a carbonyl moiety wherein the group is bonded via the carbonyl carbon atom. The carbonyl carbon atom is also bonded to a hydroxy group or oxygen anion so as to result in a carboxylic acid or carboxylate. Carboxy also includes both the protonated form of the carboxylic acid and the salt form. For example, carboxy can be understood as COOH or CO₂H.

The term "alkylthio" as used herein refers to a sulfur atom connected to an alkyl, alkenyl, or alkynyl group as defined herein.

The term "arylthio" as used herein refers to a sulfur atom connected to an aryl group as defined herein.

The term "alkylsulfonyl" as used herein refers to a sulfonyl group connected to an alkyl, alkenyl, or alkynyl group as defined herein.

The term "alkylsulfinyl" as used herein refers to a sulfinyl group connected to an alkyl, alkenyl, or alkynyl group as defined herein.

The term "dialkylaminosulfonyl" as used herein refers to a sulfonyl group connected to a nitrogen further connected to two alkyl groups, as defined herein, and which can optionally be linked together to form a ring with the nitrogen. This term also includes the group where the nitrogen is further connected to one or two alkenyl groups in place of the alkyl groups.

The term "dialkylamino" as used herein refers to an amino group connected to two alkyl groups, as defined herein, and which can optionally be linked together to form a ring with the nitrogen. This term also includes the group where the nitrogen is further connected to one or two alkenyl groups in place of the alkyl groups.

The term "dialkylamido" as used herein refers to an amido group connected to two alkyl groups, as defined herein, and which can optionally be linked together to form a ring with the nitrogen. This term also includes the group where the nitrogen is further connected to one or two alkenyl groups in place of the alkyl groups.

The term "substituted" as used herein refers to a group that is substituted with one or more groups including, but not limited to, the following groups: halogen (e.g., F, Cl, Br, and I), R, OR, OC(O)N(R)$_2$, CN, NO, NO$_2$, ONO$_2$, azido, CF$_3$, OCF$_3$, (CH$_2$)$_{0-4}$B(OR)$_2$, methylenedioxy, ethylenedioxy, (C$_3$-C$_{20}$)heteroaryl, N(R)$_2$, Si(R)$_3$, SR, SOR, SO$_2$R, SO$_2$N(R)$_2$, SO$_3$, SO$_3$R, (CH$_2$)$_{0-4}$P(O)(OR)$_2$, (CH$_2$)$_{0-4}$O(CH$_2$)$_{0-4}$P(O)(OR)$_2$, C(O)R, C(O)C(O)R, C(O)CH$_2$C(O)R, C(S)R, C(O)OR, OC(O)R, C(O)N(R)$_2$, C(O)N(R)OH, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen, (C$_1$-C$_{20}$)alkyl or (C$_6$-C$_{20}$)aryl. Substituted also includes a group that is substituted with one or more groups including, but not limited to, the following groups: fluoro, chloro, bromo, iodo, amino, amido, alkyl, alkoxy, alkylamido, alkenyl, alkynyl, alkoxycarbonyl, acyl, formyl, arylcarbonyl, aryloxycarbonyl, aryloxy, carboxy, haloalkyl, hydroxy, cyano, nitroso, nitro, azido, trifluoromethyl, trifluoromethoxy, thio, alkylthio, arylthiol, alkylsulfonyl, alkylsulfinyl, dialkylaminosulfonyl, sulfonic acid, carboxylic acid, dialkylamino and dialkylamido. Where there are two or more adjacent substituents, the substituents can be linked to form a carbocyclic or heterocyclic ring. Such adjacent groups can have a vicinal or germinal relationship, or they can be adjacent on a ring in, e.g., an ortho-arrangement. Each instance of substituted is understood to be independent. For example, a substituted aryl can be substituted with bromo and a substituted heterocycle on the same compound can be substituted with alkyl. It is envisaged that a substituted group can be substituted with one or more non-fluoro groups. As another example, a substituted group can be substituted with one or more non-cyano groups. As another example, a substituted group can be substituted with one or more groups other than haloalkyl. As yet another example, a substituted group can be substituted with one or more groups other than tert-butyl. As yet a further example, a substituted group can be substituted with one or more groups other than trifluoromethyl. As yet even further examples, a substituted group can be substituted with one or more groups other than nitro, other than methyl, other than methoxymethyl, other than dialkylaminosulfonyl, other than bromo, other than chloro, other than amido, other than halo, other than benzodioxepinyl, other than polycyclic heterocyclyl, other than polycyclic substituted aryl, other than methoxycarbonyl, other than alkoxycarbonyl, other than thiophenyl, or other than nitrophenyl, or groups meeting a combination of such descriptions. Further, substituted is also understood to include fluoro, cyano, haloalkyl, tert-butyl, trifluoromethyl, nitro, methyl, methoxymethyl, dialkylaminosulfonyl, bromo, chloro, amido, halo, benzodioxepinyl, polycyclic heterocyclyl, polycyclic substituted aryl, methoxycarbonyl, alkoxycarbonyl, thiophenyl, and nitrophenyl groups.

As used herein, the term "salts" and "pharmaceutically acceptable salts" refer to derivatives of the disclosed compounds wherein the parent compound is modified by making acid or base salts thereof. Examples of pharmaceutically acceptable salts include, but are not limited to, mineral or organic acid salts of basic groups such as amines; and alkali or organic salts of acidic groups such as carboxylic acids. Pharmaceutically acceptable salts include the conventional non-toxic salts or the quaternary ammonium salts of the parent compound formed, for example, from non-toxic inorganic or organic acids. For example, such conventional non-toxic salts include those derived from inorganic acids such as hydrochloric, hydrobromic, sulfuric, sulfamic, phosphoric, and nitric; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, and isethionic, and the like.

Pharmaceutically acceptable salts can be synthesized from the parent compound which contains a basic or acidic moiety by conventional chemical methods. In some instances, such salts can be prepared by reacting the free acid or base forms of these compounds with a stoichiometric (or larger) amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Remington's Pharmaceutical Sciences, 17th ed., Mack Publishing Company, Easton, Pa., 1985, the disclosure of which is hereby incorporated by reference.

The term "solvate" means a compound, or a salt thereof, that further includes a stoichiometric or non-stoichiometric amount of solvent bound by non-covalent intermolecular forces. Where the solvent is water, the solvate is a hydrate.

The term "prodrug" means a derivative of a compound that can hydrolyze, oxidize, or otherwise react under biological conditions (in vitro or in vivo) to provide an active compound, particularly a compound of the invention. Examples of prodrugs include, but are not limited to, derivatives and metabolites of a compound of the invention that include biohydrolyzable moieties such as biohydrolyzable amides, biohydrolyzable esters, biohydrolyzable carbamates, biohydrolyzable carbonates, biohydrolyzable ureides, and biohydrolyzable phosphate analogues. Specific prodrugs of compounds with carboxyl functional groups are the lower alkyl esters of the carboxylic acid. The carboxylate esters are conveniently formed by esterifying any of the carboxylic acid moieties present on the molecule. Prodrugs can typically be prepared using well-known methods, such as those described by Burger's Medicinal Chemistry and Drug Discovery 6th ed. (Donald J. Abraham ed., 2001, Wiley) and Design and Application of Prodrugs (H. Bundgaard ed., 1985, Harwood Academic Publishers GmbH).

As used herein, the term "subject" or "patient" refers to any organism to which a composition described herein can be administered, e.g., for experimental, diagnostic, prophylactic and/or therapeutic purposes. Subject refers to a mammal receiving the compositions disclosed herein or subject to disclosed methods. It is understood and herein contemplated that "mammal" includes but is not limited to humans, non-human primates, cows, horses, dogs, cats, mice, rats, rabbits, and guinea pigs.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading can occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

Each embodiment described above is envisaged to be applicable in each combination with other embodiments described herein. For example, embodiments corresponding to formula (I) are equally envisaged as being applicable to formula (Ia)-(Ih).

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed can be resorted to by those of ordinary skill in the art, and that such modifications and variations are considered to be within the scope of embodiments of the present disclosure The invention is now described with reference to the following Examples. The following working examples therefore, are provided for the purpose of illustration only and specifically point out certain embodiments of the present invention, and are not to be construed as limiting in any way the remainder of the disclosure. Therefore, the examples should be construed to encompass any and all variations which become evident as a result of the teaching provided herein.

EXAMPLES

The present invention can be better understood by reference to the following examples which are offered by way of illustration. The present invention is not limited to the examples given herein.

The compounds of the various embodiments can be synthesized as described in the following examples.

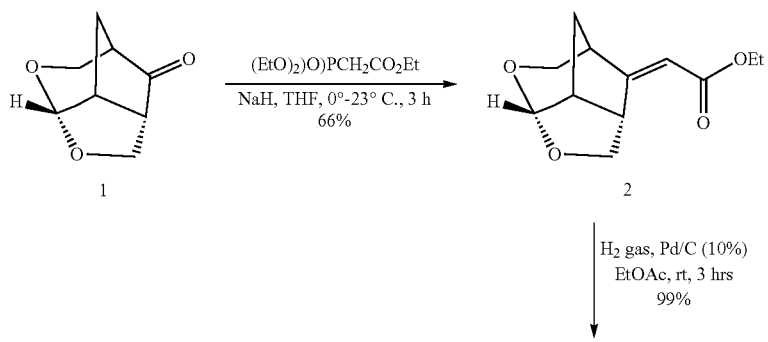

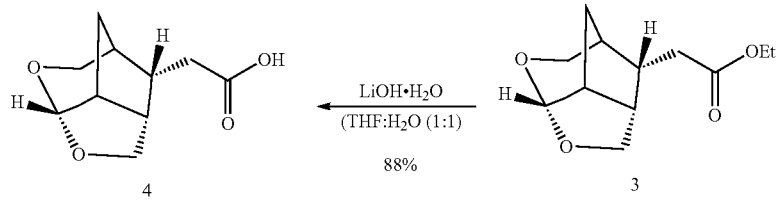

(Z)-Ethyl 2-((3R,7aS)-hexahydro-2H-3,5-methanofuro[2,3-b]pyran-8-ylidene) acetate (2): To a suspension of NaH (11 mg, 0.26 mmol) in THF (1 mL) was added (EtO)$_2$(O)PCH$_2$CO$_2$Et (60 mg, 0.26 mmol) at 0° C. and stirred for 10 min at same temperature, to that suspension was added a solution of ketone (1) (40 mg, 0.25 mmol) in THF (1 mL) at 0° C., then the reaction mixture temperature was allowed to room temperature and stirred for 3 h. The reaction mixture was quenched with water and extracted with EtOAc. The combined organic extracts were dried over anhydrous Na$_2$SO$_4$, filtered and concentrated under reduced pressure. The crude was purified via silica gel chromatography to afford pure product (2) (36 mg, 64%).

Ethyl 2-((3S,7aS,8S)-hexahydro-2H-3,5-methanofuro[2,3-b]pyran-8-yl)acetate (3): To a solution of alkene (2) (36 mg, 0.16 mmol) in EtOAc (2 mL) was added Pd/C (4 mg, 10 wt %) and then the reaction mixture was stirred under H$_2$ (balloon) atmosphere for 8 h at room temperature. The reaction mixture was filtered through celite and rinsed with EtOAc (10 mL), concentrated under reduced pressure. The ester (3) (36 mg, 99%) was used for next reaction.

2-((3S,7aS,8S)-hexahydro-2H-3,5-methanofuro[2,3-b]pyran-8-yl)acetic acid (4): To a solution of ester (3) (36 mg, 0.16 mmol) in THF/H$_2$O (1:1) (2 mL) at 0° C. temperature was added lithium hydroxide (20.8 mg, 0.50 mmol). The resulting mixture was stirred at 0° C. for 4 h, and then adds 1N HCl up to reaction pH 4 to 5 at 0° C. Then extracted with CH$_2$Cl$_2$ three times, the combined organic layers dried over anhydrous Na$_2$SO$_4$, concentrated under reduced pressure. The acid (4) (28 mg, 88%) was used for next coupling reaction.

Scheme 2

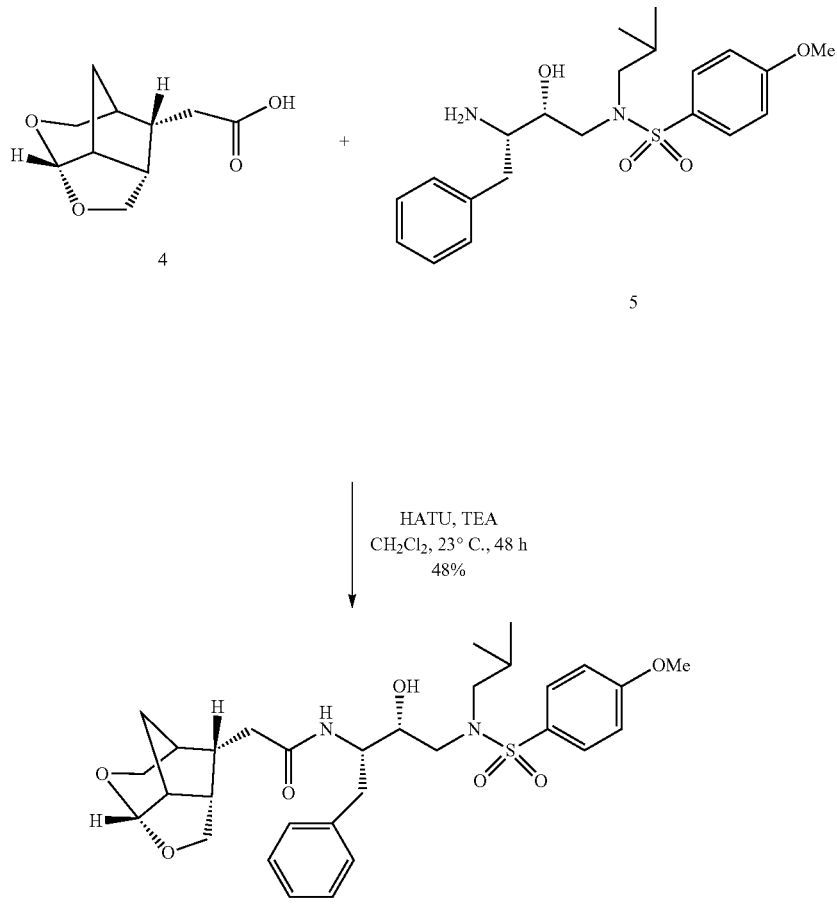

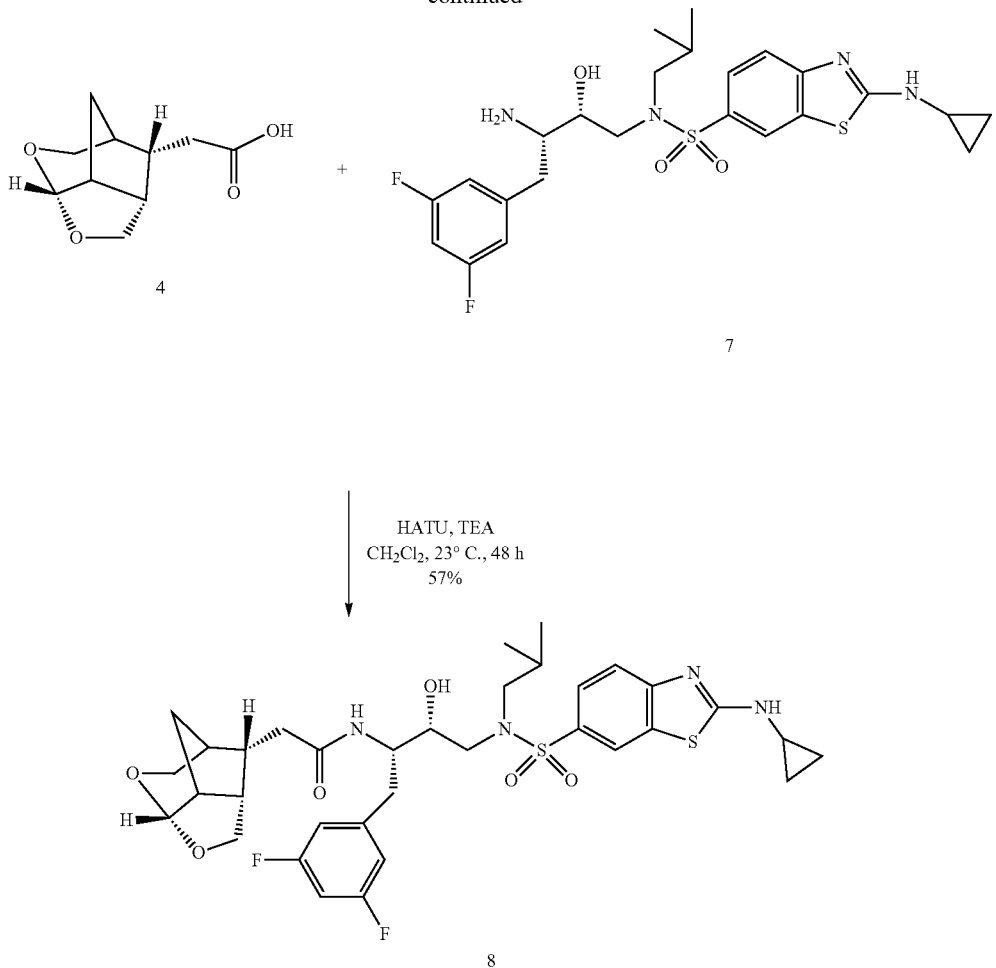

2-((3S,7aS,8S)-hexahydro-2H-3,5-methanofuro[2,3-b]pyran-8-yl)-N-((2S,3R)-3-hydroxy-4-(N-isobutyl-4-methoxyphenylsulfonamido)-1-phenylbutan-2-yl)acetamide (6): To a suspension of acid (4) (6 mg, 0.03 mmol) in CH$_2$Cl$_2$ (1 mL) was added triethylamine (0.028 mL, 0.20 mmol) at 23° C. and stirred for 5 min. To this suspension, was added HATU (16.8 mg, 0.044 mmol) at 23° C. and stirred for 30 min. A solution of amine (5) (14 mg, 0.034 mmol) in CH$_2$Cl$_2$ (1 ml) was added and the reaction mixture was stirred for 48 h. The reaction mixture was quenched with aq. NaHCO$_3$ solution and extracted with EtOAc. The combined organic extracts were dried over anhydrous Na$_2$SO$_4$, filtered, and concentrated under reduced pressure. The crude was purified via silica gel chromatography to afford product (6) (8.5 mg, 48%).

$^1$H NMR (400 MHz, CDCl3) δ 7.73 (d, J=8.9 Hz, 2H), 7.34-7.29 (m, 2H), 7.27-7.21 (m, 3H), 7.01 (d, J=8.9 Hz, 2H), 5.89 (d, J=8.5 Hz, 1H), 5.34 (t, J=5.7 Hz, 1H), 4.24 (ddd, J=13.6, 9.0, 4.5 Hz, 1H), 4.19-4.01 (m, 1H), 3.97-3.86 (m, 4H), 3.64 (dt, J=11.3, 7.1 Hz, 3H), 3.48 (dd, J=9.8, 5.5 Hz, 1H), 3.16-3.03 (m, 3H), 2.90 (dtd, J=18.1, 13.5, 7.6 Hz, 3H), 2.69-2.58 (m, 1H), 2.53-2.42 (m, 1H), 2.39-2.23 (m, 3H), 1.96 (t, J=8.5 Hz, 1H), 1.93-1.84 (m, 1H), 1.81 (d, J=11.5 Hz, 1H), 1.45 (dt, J=11.3, 4.2 Hz, 1H), 0.91 (dd, J=9.8, 6.6 Hz, 6H).

LRMS-ESI (m/z): 587.2 [M+H]$^+$.

N-((2S,3R)-4-(2-(cyclopropylamino)-N-isobutylbenzo[d]thiazole-6-sulfonamido)-1-(3,5-difluorophenyl)-3-hydroxybutan-2-yl)-2-((3S,7aS,8S)-hexahydro-2H-3,5-methanofuro[2,3-b]pyran-8-yl)acetamide (7): To a suspension of acid (5 mg, 0.02 mmol) in CH$_2$Cl$_2$ (1 mL) was added triethylamine (0.02 mL, 0.15 mmol) at 23° C. and stirred for 5 min. To that suspension, was added HATU (12.5 mg, 0.03 mmol) at 23° C. and stirred for 30 min. A solution of amine 1 (15 mg, 0.03 mmol) in CH$_2$Cl$_2$ (1 ml) was added and the reaction was stirred for 48 h. The reaction mixture was quenched with aq. NaHCO$_3$ solution and extracted with EtOAc. The combined organic extracts were dried over anhydrous Na$_2$SO$_4$, filtered, and concentrated under reduced pressure. The crude was purified via silica gel chromatography to afford product (8) (8 mg, 57%).

$^1$H NMR (400 MHz, CDCl$_3$) δ 8.08 (s, 1H), 7.68 (d, J=8.7 Hz, 1H), 7.58 (d, J=8.4 Hz, 1H), 6.79 (d, J=6.1 Hz, 2H), 6.66 (t, J=8.9 Hz, 1H), 6.38 (s, 1H), 5.95 (s, 1H), 5.35 (d, J=6.7 Hz, 1H), 4.17 (s, 2H), 3.90 (s, 1H), 3.77 (d, J=9.4 Hz, 1H), 3.60 (d, J=32.7 Hz, 2H), 3.05 (d, J=24.7 Hz, 2H), 2.98-2.83 (m, 3H), 2.79 (d, J=13.9 Hz, 1H), 2.64 (s, 1H), 2.51 (s, 1H), 2.32 (dd, J=21.8, 8.0 Hz, 3H), 2.00 (s, 1H), 1.82 (d, J=11.5 Hz, 2H), 1.62 (s, 2H), 1.47 (d, J=12.2 Hz, 1H), 0.99-0.82 (m, 8H), 0.80 (s, 2H).

LRMS-ESI (m/z): 705.2 [M+H]$^+$.

Scheme 3

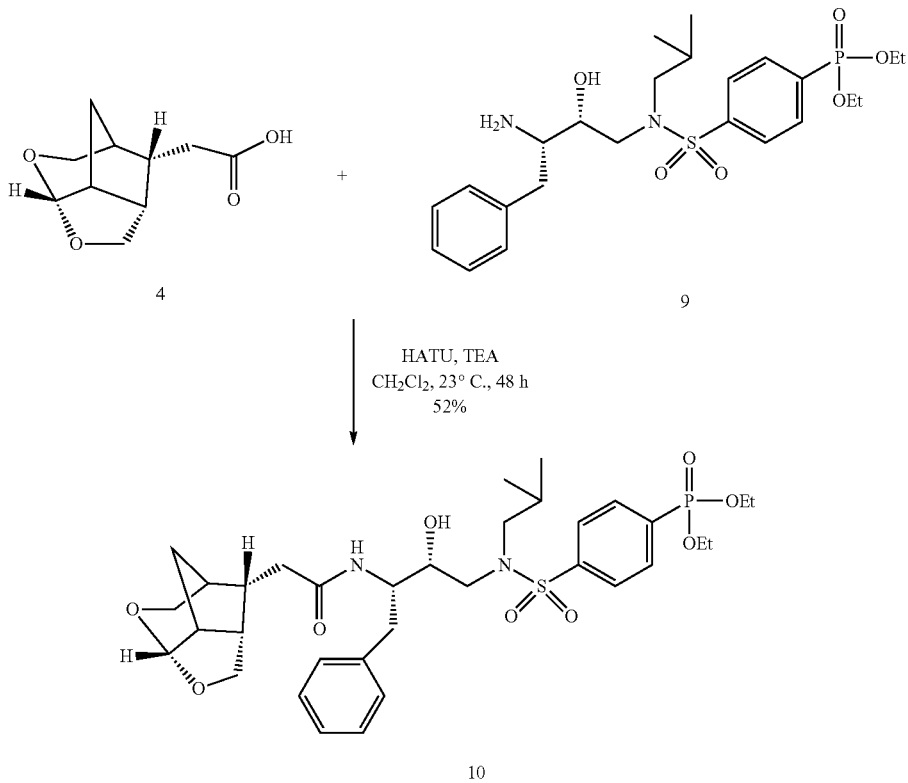

Diethyl (4-(N-((2R,3S)-3-(2-((3S,7aS,8S)-hexahydro-2H-3,5-methanofuro[2,3-b]pyran-8-yl)acetamido)-2-hydroxy-4-phenylbutyl)-N-isobutylsulfamoyl)phenyl)phosphonate (10): To a suspension of acid (4) (6.2 mg, 0.03 mmol) in CH$_2$Cl$_2$ (1 mL) was added triethylamine (0.029 mL, 0.20 mmol) at 23° C. and stirred for 5 min. To that suspension, was added HATU (17.2 mg, 0.045 mmol) at 23° C. and stirred for 30 min. A solution of amine (9) (20 mg, 0.034 mmol) in CH$_2$Cl$_2$ (1 ml) was added and the solution was stirred for 48 h. The reaction mixture was quenched with aq. NaHCO$_3$ solution and extracted with EtOAc. The combined organic extracts were dried over anhydrous Na$_2$SO$_4$, filtered, and concentrated under reduced pressure. The crude was purified via silica gel chromatography to afford product (10) (11 mg, 52%).

$^1$H NMR (400 MHz, CDCl3) δ 7.98 (dd, J=12.8, 8.4 Hz, 2H), 7.91-7.84 (m, 2H), 7.32 (dd, J=10.2, 4.4 Hz, 2H), 7.25 (dd, J=7.1, 3.0 Hz, 3H), 5.85 (d, J=8.2 Hz, 1H), 5.35 (d, J=6.9 Hz, 1H), 4.26-4.08 (m, 6H), 3.91 (s, 1H), 3.66 (dd, J=19.4, 8.2 Hz, 2H), 3.50 (dd, J=9.8, 5.5 Hz, 1H), 3.15 (d, J=6.0 Hz, 2H), 3.11-2.84 (m, 5H), 2.63 (d, J=4.2 Hz, 1H), 2.53-2.45 (m, 1H), 2.39-2.30 (m, 1H), 2.28 (d, J=7.1 Hz, 2H), 1.99 (d, J=4.4 Hz, 1H), 1.93-1.85 (m, 1H), 1.83 (d, J=11.6 Hz, 1H), 1.46 (dt, J=11.6, 4.3 Hz, 1H), 1.37 (t, J=7.1 Hz, 6H), 0.95-0.87 (m, 6H).

LRMS-ESI (m/z): 693.3 [M+H]$^+$.

Scheme 4

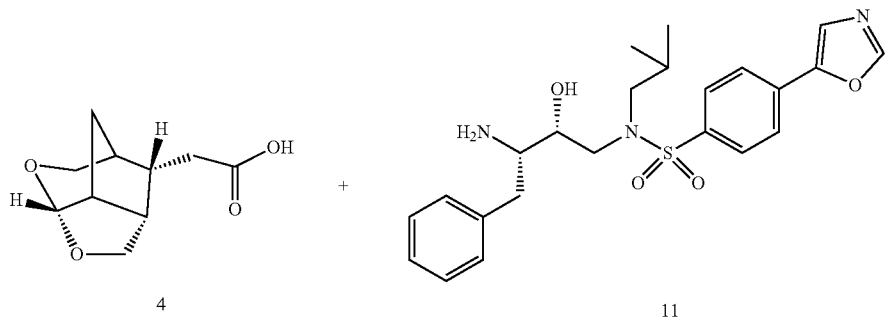

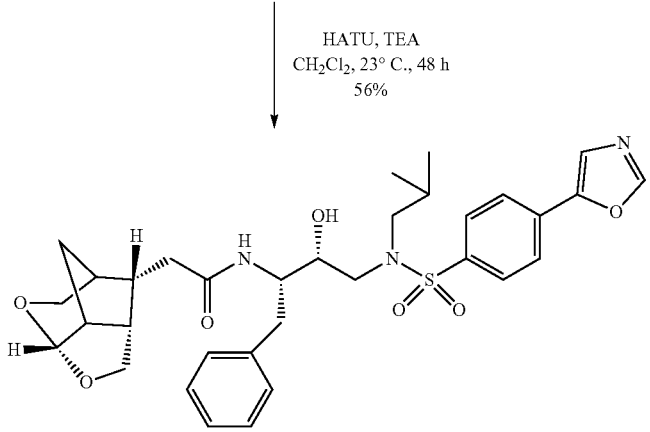

12

2-((3S,7aS,8S)-hexahydro-2H-3,5-methanofuro[2,3-b]pyran-8-yl)-N-((2S,3R)-3-hydroxy-4-(N-isobutyl-4-(oxazol-5-yl)phenylsulfonamido)-1-phenylbutan-2-yl)acetamide (12): To a suspension of acid (4) (8 mg, 0.04 mmol) in CH$_2$Cl$_2$ (1 mL) was added triethylamine (0.037 mL, 0.27 mmol) at 23° C. and stirred for 5 min. To that suspension, was added HATU (22.2 mg, 0.05 mmol) at 23° C. and stirred for 30 min. A solution of amine (11) (20 mg, 0.042 mmol) in CH$_2$Cl$_2$ (1 ml) was added and the mixture was stirred for 48 h. The reaction mixture was quenched with aq. NaHCO$_3$ solution and extracted with EtOAc. The combined organic extracts were dried over anhydrous Na$_2$SO$_4$, filtered, and concentrated under reduced pressure. The crude was purified via silica gel chromatography to afford product (12) (14 mg, 56%).

$^1$H NMR (400 MHz, CDCl3) δ 8.00 (s, 1H), 7.82 (q, J=8.6 Hz, 4H), 7.52 (s, 1H), 7.33-7.27 (m, 2H), 7.23 (d, J=6.3 Hz, 3H), 5.83 (d, J=8.2 Hz, 1H), 5.35-5.30 (m, 1H), 4.27-4.16 (m, 1H), 3.89 (d, J=4.1 Hz, 1H), 3.69-3.56 (m, 3H), 3.47 (dd, J=9.8, 5.5 Hz, 1H), 3.14 (d, J=6.0 Hz, 2H), 3.09-3.00 (m, 1H), 2.99-2.85 (m, 3H), 2.61 (d, J=3.9 Hz, 1H), 2.46 (dt, J=11.9, 6.1 Hz, 1H), 2.36-2.27 (m, 1H), 2.25 (d, J=7.2 Hz, 2H), 1.96 (d, J=4.6 Hz, 1H), 1.88 (dt, J=14.0, 6.9 Hz, 1H), 1.79 (d, J=11.5 Hz, 1H), 1.43 (dt, J=11.4, 4.2 Hz, 1H), 1.28 (t, J=5.9 Hz, 1H), 0.89 (dd, J=9.5, 5.0 Hz, 6H).

LRMS-ESI (m/z): 624.3 [M+H]$^+$.

Antiviral activity of compounds described herein against highly DRV-resistant HIV-1 variants was studied and the following results were obtained and compared with known compounds.

|  | IC$_{50}$ (nM) | | | |
| --- | --- | --- | --- | --- |
|  | A | B | C | D |
| HIV-1$_{LAI}^{WT}$ | 2.9 | 0.079 | 0.052 | 0.018 |
| HIV$_{DRV}^R$P20 | 252 | 0.009 | 0.001 | 1.9 |
| HIV$_{DRV}^R$P51 | 23,000 | 5.3 | 1.4 | 158 |

The results demonstrate the high activity of compounds A and B within the formula (I), disclosed herein, against wild-type HIV-1$_{LAI}^{WT}$. But an additional remarkable observation can be made from these results is that compounds A and B are significantly more potent than an analogous compound, also disclosed herein, against darunavir (DRV)-resistant HIV-1 variants HIV$_{DRV}^R$P20 and HIV$_{DRV}^R$P51, respectively. Compounds C and D have been disclosed previously.

The present invention provides for the following exemplary embodiments, the numbering of which is not to be construed as designating levels of importance:

Embodiment 1 relates to a compound of the formula (I):

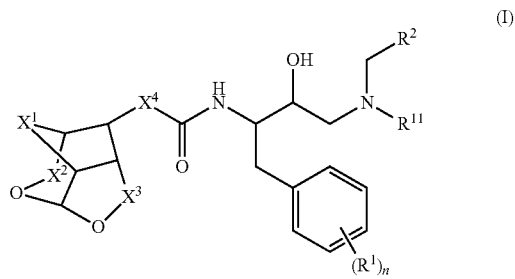

(I)

or a pharmaceutically acceptable salt, polymorph, prodrug, solvate or clathrate thereof, wherein:

X$^1$ is alkylene, —O—, —CH$_2$NR$^4$—, —CH$_2$O— or —NR$^4$—;

X$^2$ and X$^3$ are each, independently alkylene;

X$^4$ is alkylene, —NR$^4$—, —CHR$^4$— or —CR$^{4a}$R$^{4b}$—, wherein R$^4$ is alkyl, aryl, heteroaryl, NHR$^{4c}$ or OR$^{4c}$, wherein R$^{4c}$ is H, alkyl, alkyl, alkylaryl or heterocyclylalkyl, R$^{4a}$ is NHR$^{4d}$ or OR$^{4d}$, wherein R$^{4b}$ is alkyl and R$^{4c}$ is H, alkyl, cycloalkyl or heterocyclyl or R$^{4a}$ and R$^{4b}$, together with the nitrogen atom to which they are attached, form a cycloalkyl ring or a heterocyclyl ring;

n is an integer from 0 to 4;

R$^1$ is alkoxy, hydroxyalkyl, halo or heterocyclylalkyloxy;

R$^2$ is alkyl, haloalkyl, aryl, arylalkyl, cycloalkylalkyl, heterocyclylcarbonyl, heterocyclyl, heterocyclylalkyl or —C(R$^7$R$^8$)-alkylene-R$^9$, wherein R$^7$ and R$^8$ are each, independently hydrogen, alkyl, aryl, arylalkyl, heteroaryl, heteroarylalkyl, or, R$^7$ and R$^8$, together with the carbon atom to which they are attached, form a cycloalkyl or a heterocyclyl group, $R^9$ is hydrogen, $OR^{10}$, $OC(O)N(R^{10})_2$, CN, $NO_2$, $CF_3$, $OCF_3$, $N(R^{10})_2$, $SR^{10}$, $SOR^{10}$, $SO_2R^{10}$, $SO_2N(R^{10})_2$, $SO_3R$, $C(O)R^{10}$, $C(O)OR^{10}$, $OC(O)R^{10}$, $C(O)N(R^{10})_2$, $(CH_2)_{0-2}N(R^{10})C(O)R^{10}$ or $(CH_2)_{0-2}N(R^{10})C(O)OR^{10}$, and $R^{10}$ is hydrogen, alkyl, acyl, cycloalkyl, aryl, aralkyl, heterocyclyl, heteroaryl, or heteroarylalkyl;

$R^{11}$ is —$SO_2R^3$, —$C(O)N(R^{12})_2$, —C(O)-alkylene-$X^5$-$R^{10}$, wherein $X^5$ is S, O or $NR^6$, $R^6$ is H, alkyl, cycloalkyl or alkylaryl or —$C(O)R^{10}$; and $R^3$ is aryl or heterocyclyl;

$R^{12}$ is hydrogen, alkyl, alkylaryl, heterocyclyl or the two $R^{12}$ groups on an $N(R^{12})_2$, together with the nitrogen atom to which they are attached, form a heterocyclyl group; and $R^{13}$ is hydrogen, alkyl, —$N(R^{12})_2$ or –$OR^{12}$.

Embodiment 2 relates to the compound of Embodiment 1, wherein the compounds of the formula (I) are of the formula (Ia)-(Ih):

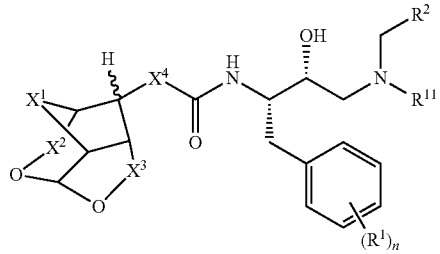

(Ia)

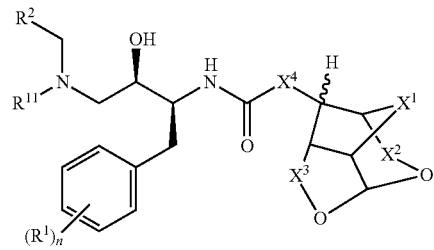

(Ib)

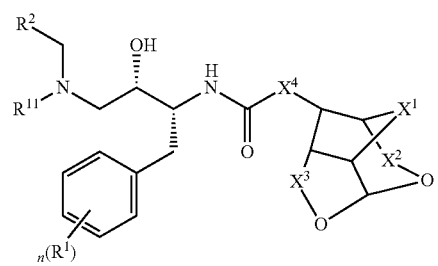

(Ic)

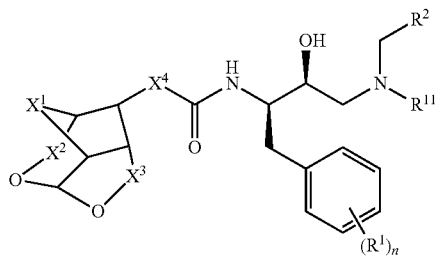

(Id)

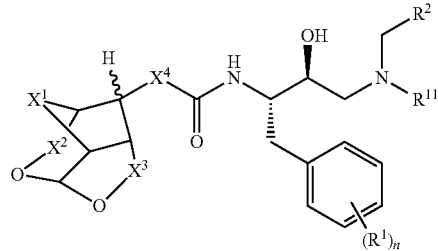

(Ie)

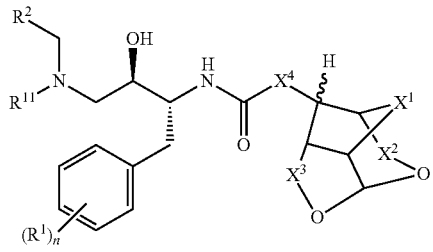

(If)

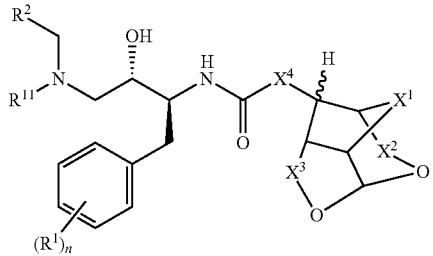

(Ig)

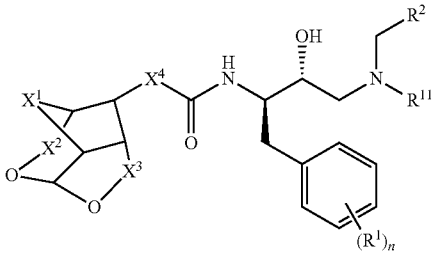

(Ih)

or a pharmaceutically acceptable salt, polymorph, prodrug, solvate or clathrate thereof.

Embodiment 3 relates to the compound of Embodiment 1 or 2, wherein $X^1$ is alkylene.

Embodiment 4 relates to the compound of any preceding Embodiment, wherein $X^2$ is alkylene.

Embodiment 5 relates to the compound of any preceding Embodiment, wherein $X^3$ is alkylene.

Embodiment 6 relates to the compound of any preceding Embodiment, wherein $X^4$ is alkylene.

Embodiment 7 relates to the compound of any preceding Embodiment, wherein $X^1$, $X^2$, $X^3$, and $X^4$ are —$CH_2$—.

Embodiment 8 relates the compound of Embodiments 1-6, wherein $X^1$ is —$CH_2$—; $X^2$ is —$CH_2$; $X^3$ is —$CH_2CH_2$—, and $X^4$ is —$CH_2$.

Embodiment 9 relates the compound of Embodiments 1-6, wherein $X^1$ is —$CH_2$—; $X^2$ is —$CH_2CH_2$—; $X^3$ is —$CH_2$, and $X^4$ is —$CH_2$.

Embodiment 10 relates to the compound of Embodiments 1-6, wherein $X^1$ is —$CH_2CH_2$—; $X^2$ is —$CH_2$; $X^3$ is —$CH_2$, and $X^4$ is —$CH_2$.

Embodiment 11 relates to the compound of any preceding Embodiment, wherein n is 1 to 3 or 2 to 3.

Embodiment 12 relates to the compound of any preceding Embodiment, wherein the phenyl ring to which R¹ is attached is substituted with halo or alkoxy.

Embodiment 13 relates to the compound of any preceding Embodiment, wherein the phenyl ring to which R¹ is attached is substituted is mono-, di- or tri-substituted with fluoro.

Embodiment 14 the compound of Embodiments 1-12, wherein the phenyl ring to which R¹ is attached is tri-substituted with two fluoro groups and one alkoxy group.

Embodiment 15 relates to the compound of any preceding Embodiment, wherein R² is alkyl.

Embodiment 16 relates to the compound of any preceding Embodiment, wherein $R^{11}$ is —$SO_2R^3$, wherein $R^3$ is aryl.

Embodiment 17 relates to the compound of Embodiment 16, wherein the aryl group is substituted with at least one alkenyl group, cycloalkyl group, heterocyclyl group, $(CH_2)_{0-4}B(OR)_2$, $(CH_2)_4P(O)(OR)_2$ and $(CH_2)_{0-4}O(CH_2)_{0-4}P(O)(OR)_2$ Embodiment 18 relates to the compound of Embodiment 16, wherein the aryl is substituted with heterocyclyl selected from the group consisting of 4,5-dihydrooxazolyl, oxazolyl, oxadiazolyl, indolyl, and isoindolyl group.

Embodiment 19 relates to the compound of Embodiments 1-14, wherein $R^{11}$ is —$SO_2R^3$, wherein $R^3$ is heterocyclyl, wherein the heterocyclyl is a $C_6$-$C_8$ heteroaryl.

Embodiment 20 relates to the compound of Embodiments 1-14, wherein $R^3$ is substituted $C_6$-$C_8$ heteroaryl having the formula:

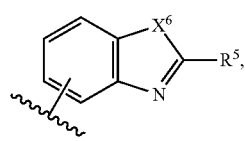

wherein $R^5$ is $C_1$-$C_6$ alkylamino; and $X^6$ is S, O or $NR^6$, wherein $R^6$ is H, alkyl, cycloalkyl or alkylaryl.

Embodiment 21 relates to the compound of Embodiment 20, wherein $R^5$ is —$NHCH_3$, —$NHCH(CH_3)_2$, —NHcyclopropyl, —$NHCH_2CH(CH_3)_2$, and —$NHC(CH_3)_3$.

Embodiment 22 relates to the compound of Embodiment 20 or 21, wherein $X^6$ is S.

Embodiment 23 relates to the compound of any preceding Embodiment, wherein the compound has the formula:

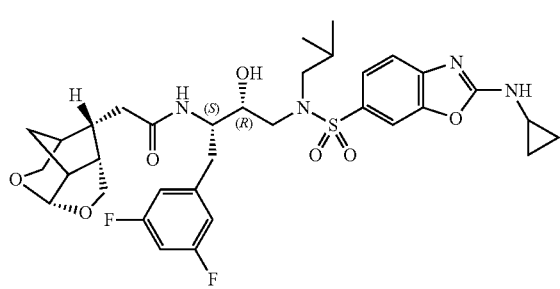

9

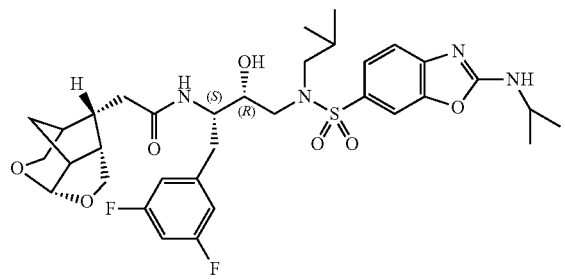

10

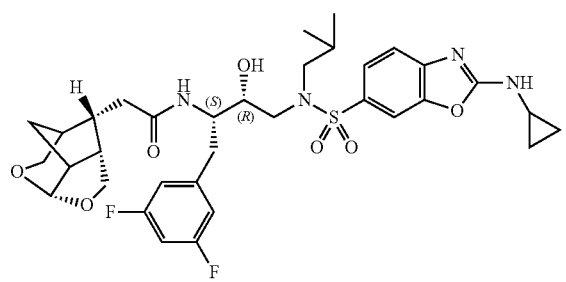

11

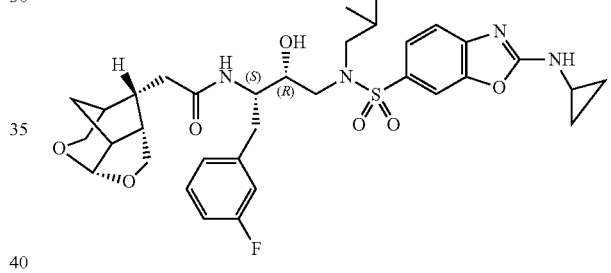

12

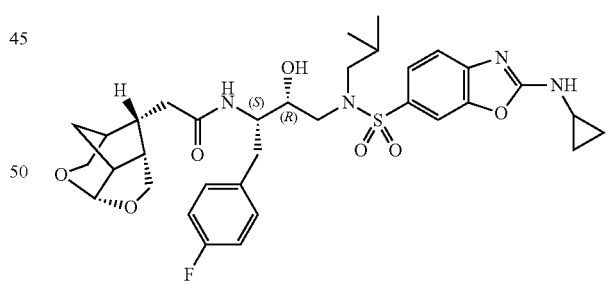

13

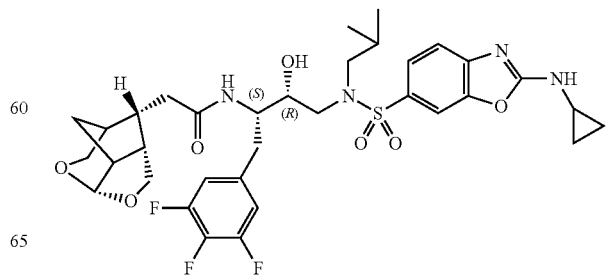

14

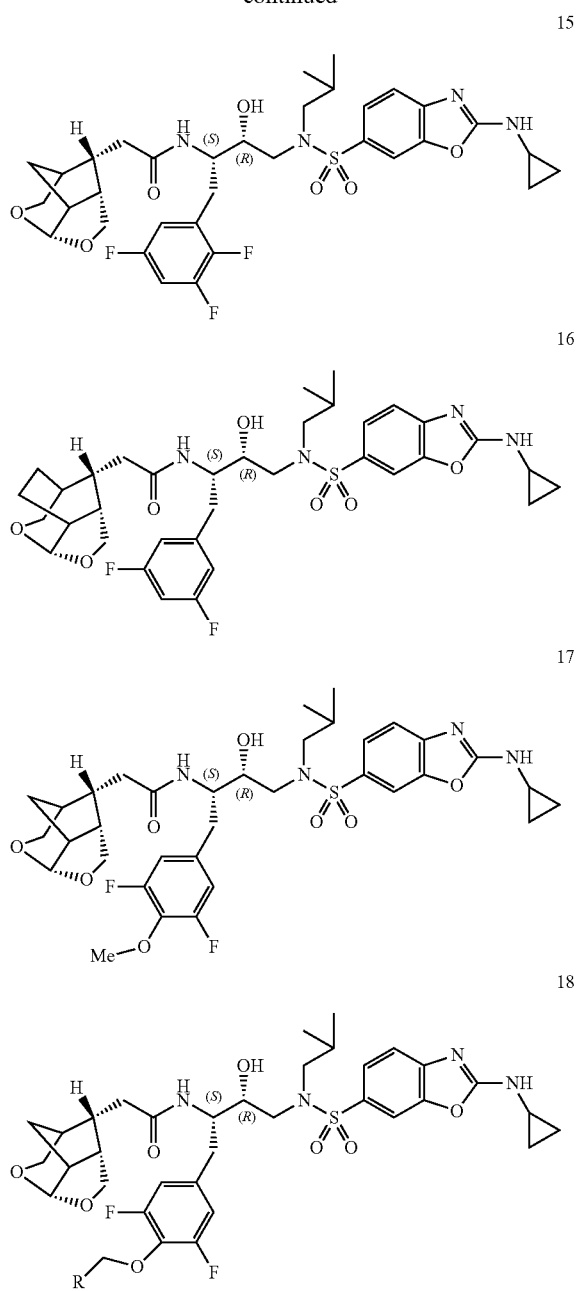
or a pharmaceutically acceptable salt, polymorph, prodrug, solvate or clathrate thereof.
Embodiment 24 relates to the compound of Embodiments 1-22, wherein the compound has the formula:

41
-continued
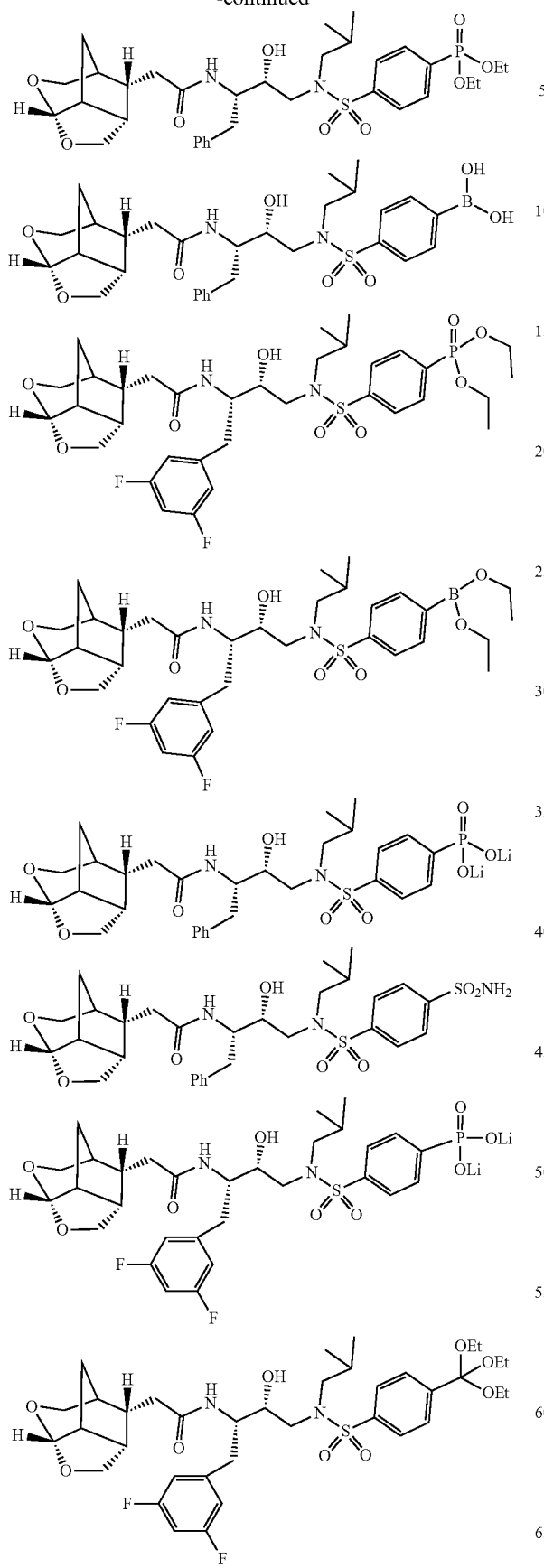
42
-continued
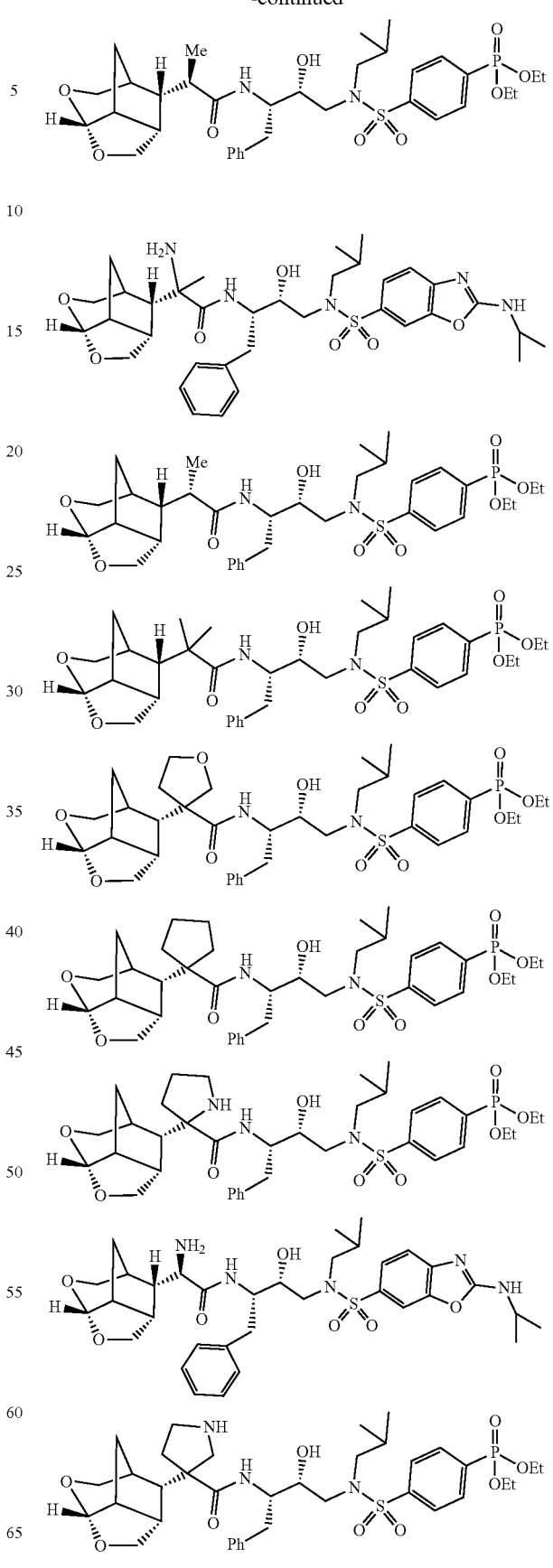

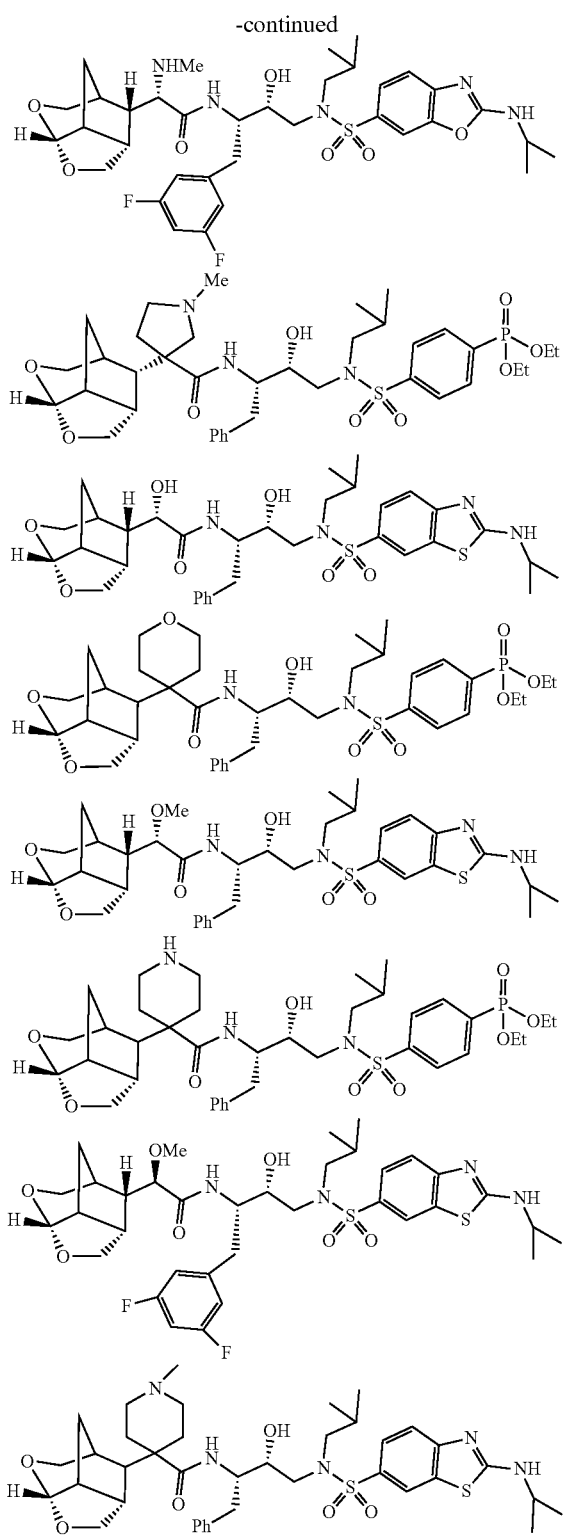

or a pharmaceutically acceptable salt, polymorph, prodrug, solvate or clathrate thereof.

Embodiment 25 relates to the compound of any preceding Embodiment, wherein the compound has an HIV-1 protease inhibition constant ($K_i$) of from about 1 pM to about 100 nM.

Embodiment 26 relates to the compound of Embodiments 1-25, wherein the compound has an antiviral activity in vitro against a wild-type laboratory strain, HIV-1$_{LAI}$ with half-maximal inhibitory concentration ($IC_{50}$) of from about 1 pM to about 100 nM.

Embodiment 27 relates to the compound of Embodiments 1-25, wherein the compound has an antiviral activity in vitro against a darunavir-resistant HIV-1 variant with half-maximal inhibitory concentration ($IC_{50}$) of from about 1 pM to about 100 nM.

Embodiment 28 relates to the compound of Embodiments 1-25, wherein the compound has an antiviral activity in vitro against a wild-type laboratory strain, HIV-1$_{LAI}$ and an antiviral activity in vitro against a darunavir-resistant HIV-1 variant with half-maximal inhibitory concentration ($IC_{50}$) of from about 1 pM to about 100 nM.

Embodiment 29 relates to the compound of Embodiment 24 or 25, wherein the darunavir-resistant HIV-1 variant is DRV$_R$P20, DRV$_R$P30, and DRV$_R$P51.

Embodiment 30 relates to a pharmaceutical composition comprising a compound of Embodiments 1-29 and one or more pharmaceutically acceptable excipients.

Embodiment 31 relates to a method for treating an HIV infection comprising administering a therapeutically effective amount of one or more compounds of Embodiments 1-29 to a patient in need thereof.

What is claimed is:

1. A compound of formula (I):

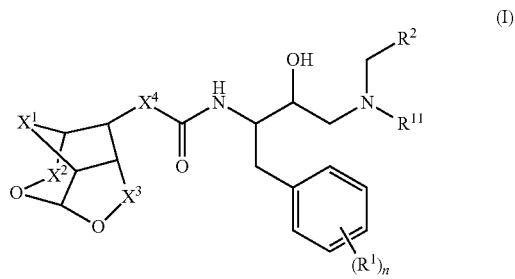

or a pharmaceutically acceptable salt or solvate thereof, wherein:

$X^1$-$X^4$ are each independently alkylene;
n is an integer from 0 to 4;
$R^1$ is alkoxy, hydroxyalkyl, halo or heterocyclylalkyloxy;
$R^2$ is alkyl,
$R^{11}$ is —$SO_2R^3$; and
$R^3$ is heterocyclyl.

2. The compound of claim 1, wherein the compounds of the formula (I) are of the formula (Ia)-(Ih):

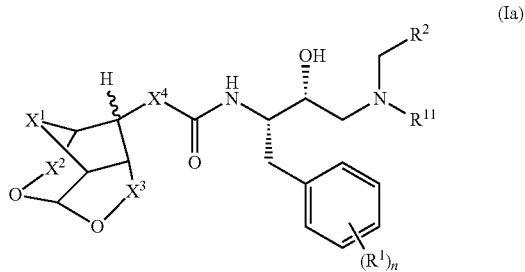

(Ib)
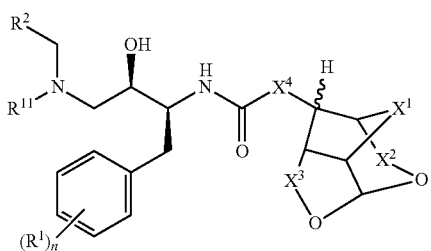

(Ic)
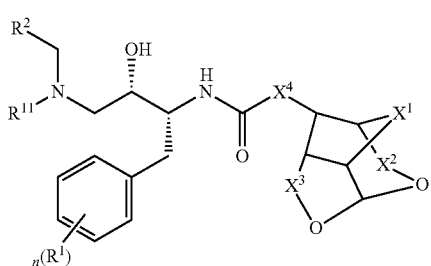

(Id)
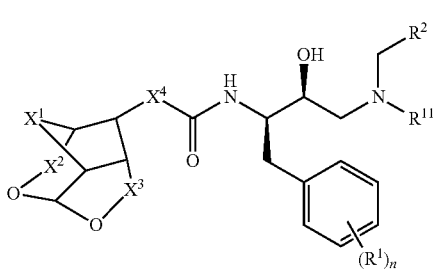

(Ie)
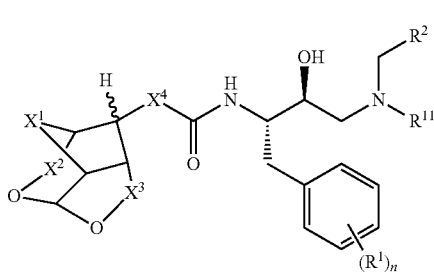

(If)
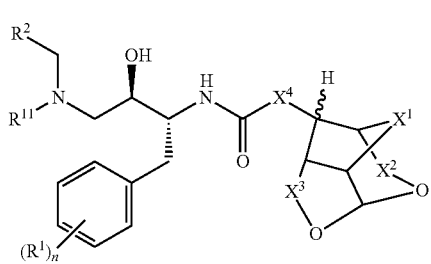

(Ig)
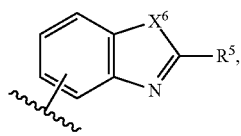

(Ih)
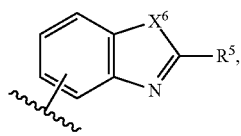

or a pharmaceutically acceptable salt or solvate thereof.

3. The compound of claim 1, or a pharmaceutically acceptable salt or solvate thereof, wherein $X^1$, $X^2$, $X^3$, and $X^4$ are —$CH_2$—;

$X^1$ is —$CH_2$—; $X^2$ is —$CH_2$—; $X^3$ is —$CH_2CH_2$—, and $X^4$ is —$CH_2$—;

$X^1$ is —$CH_2$—; $X^2$ is —$CH_2CH_2$—; $X^3$ is —$CH_2$—, and $X^4$ is —$CH_2$—; or $X^1$ is —$CH_2CH_2$—; $X^2$ is —$CH_2$—; $X^3$ is —$CH_2$—, and $X^4$ is —$CH_2$.

4. The compound of claim 1, or a pharmaceutically acceptable salt or solvate thereof, wherein n is 1 to 3 or 2 to 3.

5. The compound of claim 1, or a pharmaceutically acceptable salt or solvate thereof, wherein each $R^1$ is halo or alkoxy.

6. The compound of claim 1, or a pharmaceutically acceptable salt or solvate thereof, wherein n is 1, 2 or 3, wherein each $R^1$ is fluoro.

7. The compound of claim 1, or a pharmaceutically acceptable salt or solvate thereof, wherein $R^3$ is $C_6$-$C_8$ heteroaryl.

8. The compound of claim 1, or a pharmaceutically acceptable salt or solvate thereof, wherein $R^3$ is substituted $C_6$-$C_8$ heteroaryl having the formula:

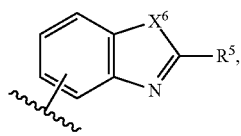

wherein $R^5$ is $C_1$-$C_6$ alkylamino; and $X^6$ is S, O or $NR^6$, wherein $R^6$ is H, alkyl, cycloalkyl or alkylaryl.

9. The compound of claim 8, or a pharmaceutically acceptable salt or solvate thereof, wherein $R^5$ is —$NHCH_3$, —$NHCH(CH_3)_2$, -NHcyclopropyl, —$NHCH_2CH(CH_3)_2$, and —$NHC(CH_3)_3$.

10. The compound of claim 8, or a pharmaceutically acceptable salt or solvate thereof, wherein $X^6$ is S.

11. The compound of claim 1, wherein the compound has the formula:
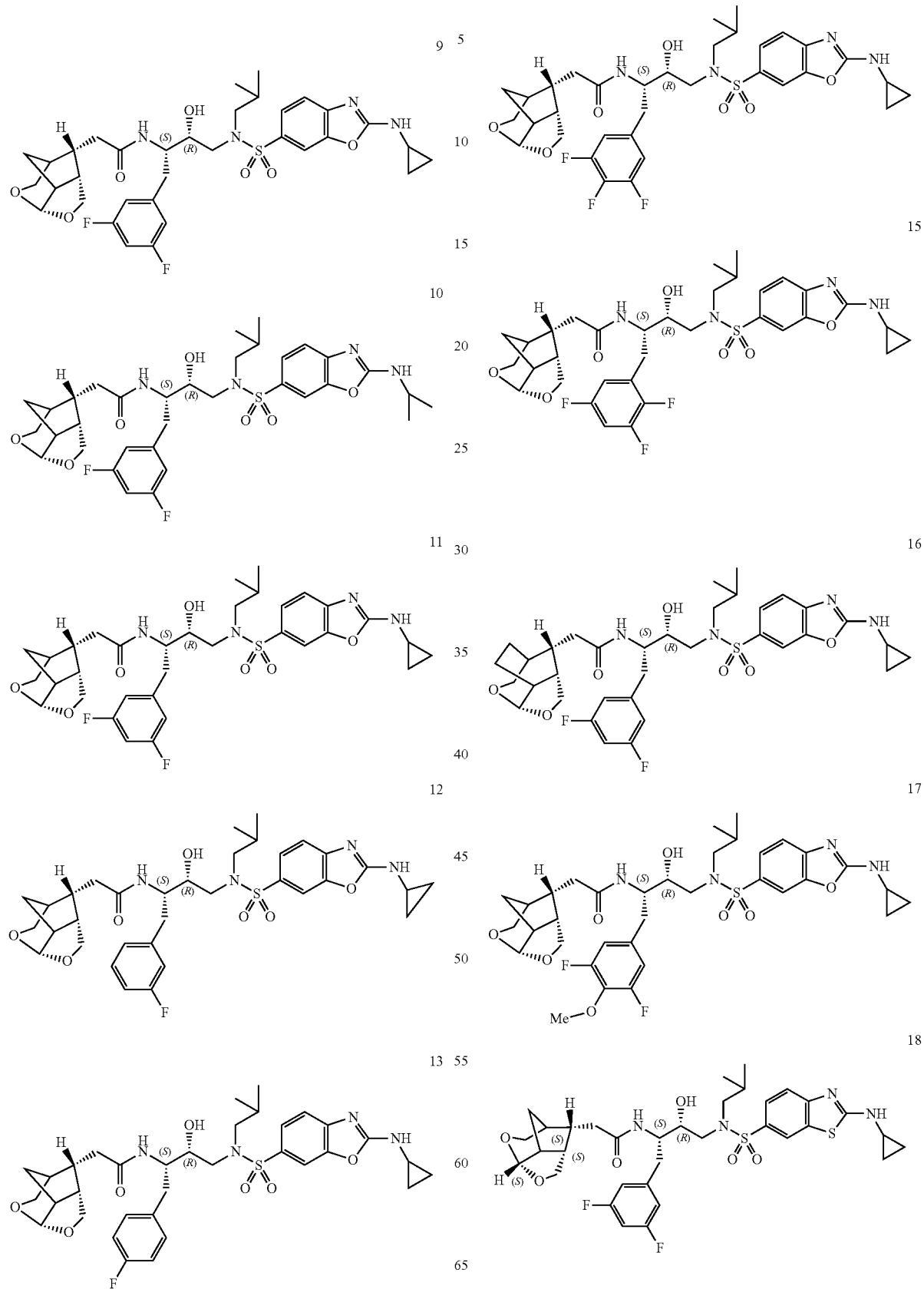
or a pharmaceutically acceptable salt or solvate thereof.

12. The compound of claim 1, wherein the compound has the formula:
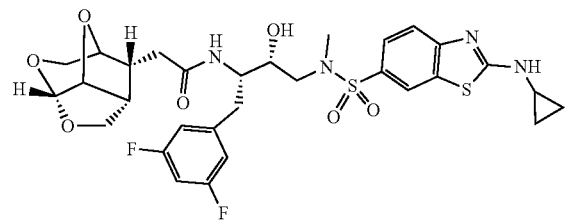
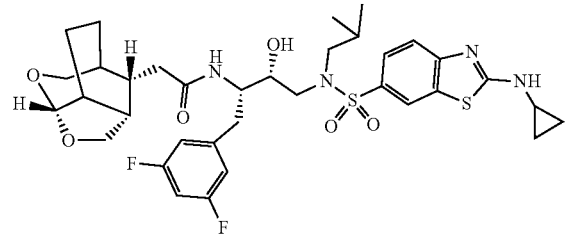
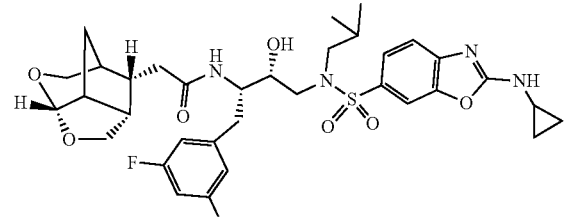
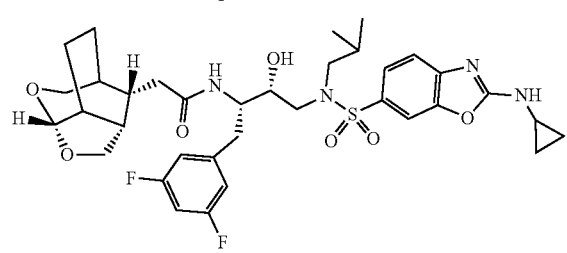
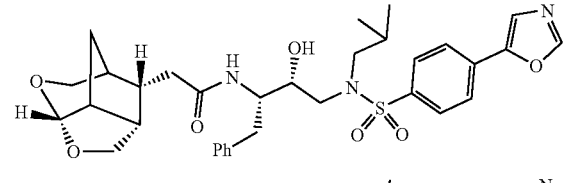
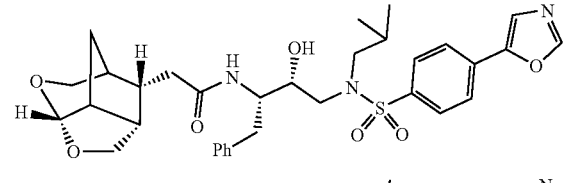
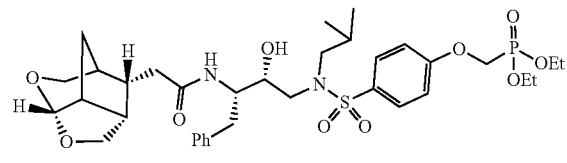
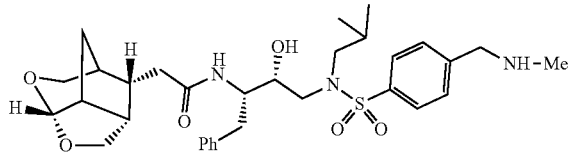
-continued
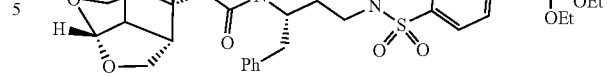
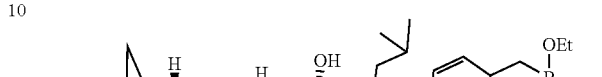
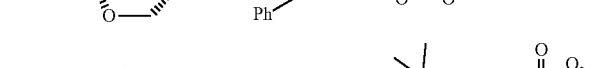
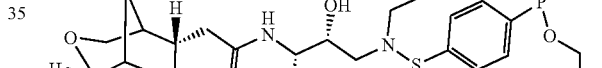
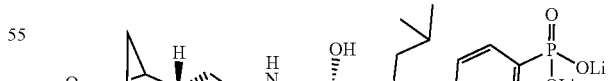
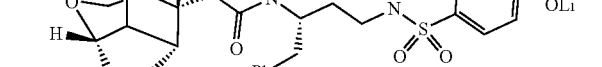
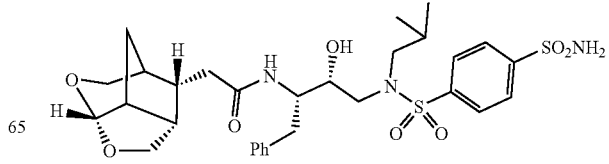

-continued

-continued

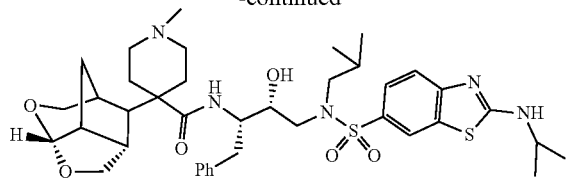

or a pharmaceutically acceptable salt or solvate thereof.

13. The compound of claim 1, or a pharmaceutically acceptable salt or solvate thereof, wherein the compound has at least one of: an HIV-1 protease inhibition constant ($K_i$) of from about 1 µM to about 100 nM;

an antiviral activity in vitro against a wild-type laboratory strain, HIV-$_{1LAI}$ with half-maximal inhibitory concentration ($IC_{50}$) of from about 1 µM to about 100 nM;

an antiviral activity in vitro against a darunavir-resistant HIV-1 variant with half-maximal inhibitory concentration ($IC_{50}$) of from about 1 µM to about 100 nM; and an antiviral activity in vitro against a wild-type laboratory strain, HIV-$_{1LAI}$ and an antiviral activity in vitro against a darunavir-resistant HIV-1 variant with half-maximal inhibitory concentration ($IC_{50}$) of from about 1 µM to about 100 nM.

14. The compound of claim 13, or a pharmaceutically acceptable salt or solvate thereof, wherein the darunavir-resistant HIV-1 variant is selected from DRV$_R$P20, DRV$_R$P30, and DRV$_R$P51.

15. A pharmaceutical composition comprising the compound of claim 1, or a pharmaceutically acceptable salt or solvate thereof, and one or more pharmaceutically acceptable excipients.

16. A method for treating an HIV infection comprising administering a therapeutically effective amount of one or more compounds of claim 1, or a pharmaceutically acceptable salt or solvate thereof, to a patient in need thereof.

* * * * *